(12) United States Patent
Kadoshima et al.

(10) Patent No.: US 6,526,282 B1
(45) Date of Patent: Feb. 25, 2003

(54) METHOD AND APPARATUS FOR CONTROLLING THE RESTRICTION ON TRAFFIC IN MOBILE COMMUNICATION SYSTEM

(75) Inventors: Shiro Kadoshima, Kawasaki (JP); Takayuki Iseyama, Kawasaki (JP); Masaru Ebina, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/324,160

(22) Filed: Jun. 2, 1999

(30) Foreign Application Priority Data

Aug. 3, 1998 (JP) .......................................... 10-219080

(51) Int. Cl.⁷ ................................................ H04Q 7/20
(52) U.S. Cl. ...................................... 455/453; 455/433
(58) Field of Search ............................... 455/422, 432, 455/433, 435, 436, 439, 445, 450, 453, 455, 456, 507, 509, 513, 515, 560

(56) References Cited

U.S. PATENT DOCUMENTS

| | | | | |
|---|---|---|---|---|
| 4,670,899 A | * | 6/1987 | Brody et al. ................. | 455/453 |
| 5,293,641 A | * | 3/1994 | Kallin et al. ................. | 455/453 |
| 5,454,026 A | * | 9/1995 | Tanaka ........................ | 455/437 |
| 5,548,533 A | * | 8/1996 | Gao et al. .................... | 364/514 |
| 5,754,959 A | * | 5/1998 | Ueno et al. .................. | 455/453 |
| 5,787,347 A | * | 7/1998 | Yu et al. ..................... | 455/440 |
| 5,790,955 A | * | 8/1998 | Tomoike ....................... | 455/453 |
| 5,815,816 A | * | 9/1998 | Isumi .......................... | 455/458 |
| 5,867,787 A | * | 2/1999 | Vudali et al. ................ | 455/445 |
| 5,978,681 A | * | 11/1999 | Bertacchi .................... | 455/445 |
| 5,983,102 A | * | 11/1999 | Gozes ......................... | 455/432 |
| 6,055,433 A | * | 4/2000 | Yuan et al. .................. | 455/453 |
| 6,064,892 A | * | 5/2000 | Miyagawa et al. .......... | 455/560 |
| 6,112,081 A | * | 8/2000 | Namura et al. ............. | 455/424 |
| 6,169,892 B1 | * | 1/2001 | Sollee ......................... | 455/411 |
| 6,188,883 B1 | * | 2/2001 | Takemura ................... | 455/411 |
| 6,285,875 B1 | * | 9/2001 | Alajoki et al. .............. | 455/423 |

FOREIGN PATENT DOCUMENTS

| | | |
|---|---|---|
| JP | 5-218959 | 8/1993 |
| JP | 6-70366 | 3/1994 |

* cited by examiner

*Primary Examiner*—Dwayne Bost
*Assistant Examiner*—Joy K. Contee
(74) *Attorney, Agent, or Firm*—Katten Muchin Zavis Rosenman

(57) ABSTRACT

A method and apparatus for controlling the restriction on traffic in a mobile communication system enabling an efficient mobile communication system with little wasted processing, wherein the apparatus for controlling the restriction on traffic includes a report unit provided in a mobile communication switching center for reporting a processing state indicating a congested state or a normal state to a management center in advance; a management unit provided in the management center for managing the processing states of each mobile communication switching center based on the reports of the processing states; a notifying unit provided in the management center for investigating by the management unit the processing state of a destination mobile communication switching center in response to a request, from a gateway mobile switching center, for a location of a destination to be connected to a call and notifying the gateway mobile switching center that the processing state is a congested state when in a congested state; and a control unit provided in the gateway mobile switching center for controlling the system so that, when receiving a notification of a congested state, the gateway mobile switching center does not connect a speech channel to the mobile communication switching center in a congested state.

21 Claims, 15 Drawing Sheets

CONGESTED STATE MANAGEMENT TABLE 7

| MOBILE COMMUNICATION SWITCHING CENTER | PROCESSING STATE |
|---|---|
| MSC # 1 | CONGESTED |
| MSC # 2 | NORMAL |
| MSC # 3 | NORMAL |
| ⋮ | ⋮ |
| ⋮ | ⋮ |

Fig.1

CONGESTED STATE
MANAGEMENT TABLE  7

| MOBILE COMMUNICATION SWITCHING CENTER | PROCESSING STATE |
|---|---|
| MSC # 1 | CONGESTED |
| MSC # 2 | NORMAL |
| MSC # 3 | NORMAL |
| ⋮ | ⋮ |
| ⋮ | ⋮ |

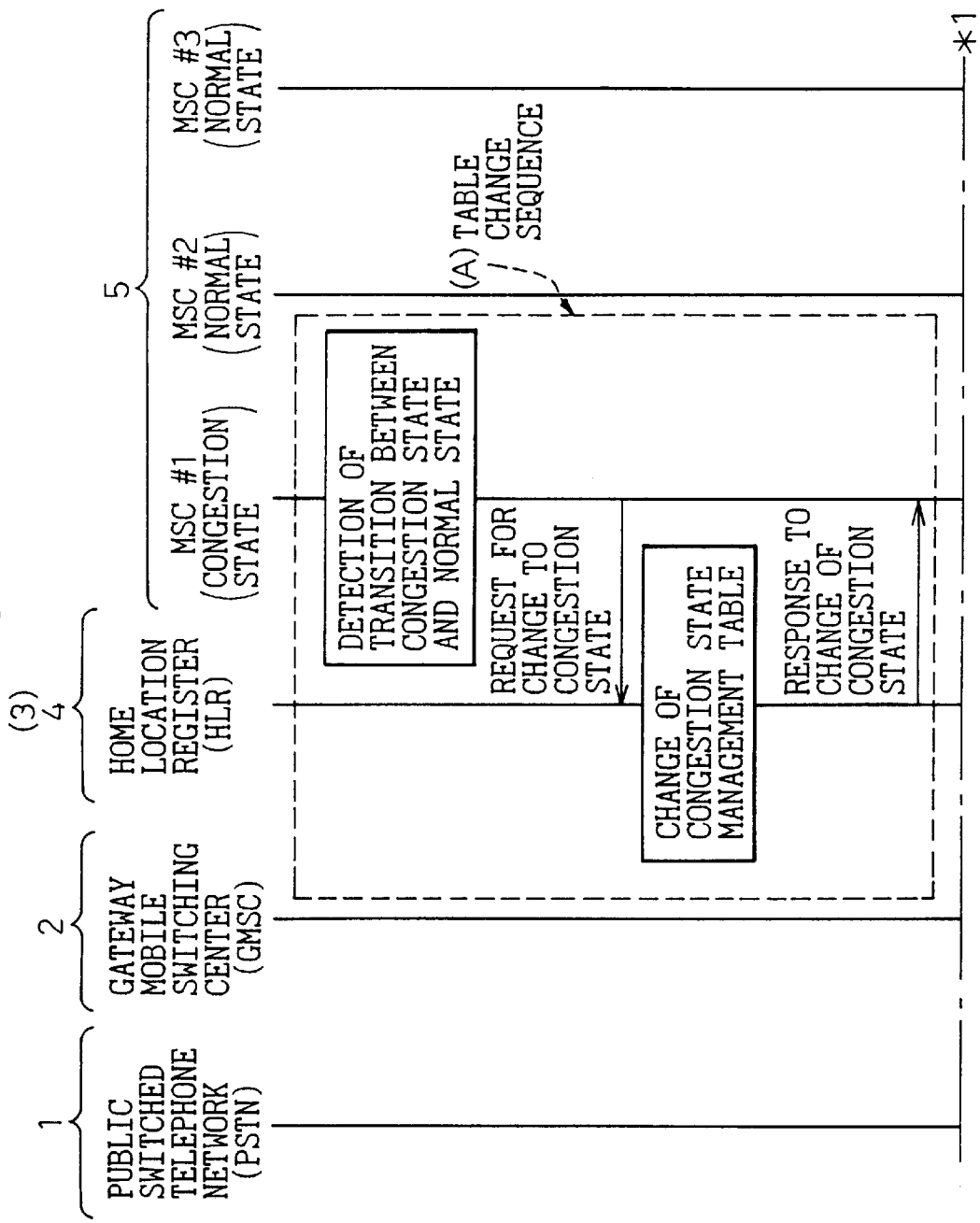

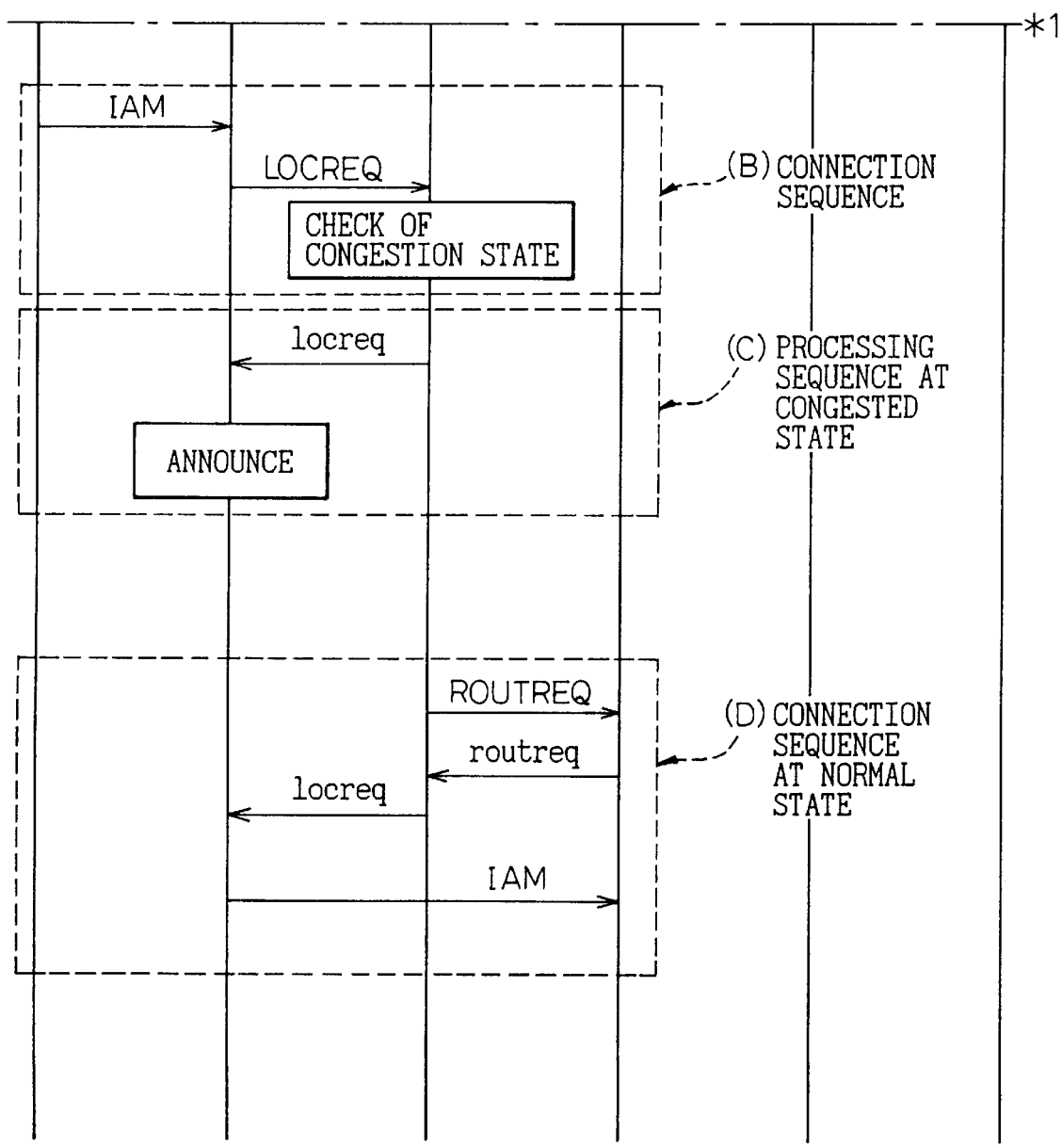

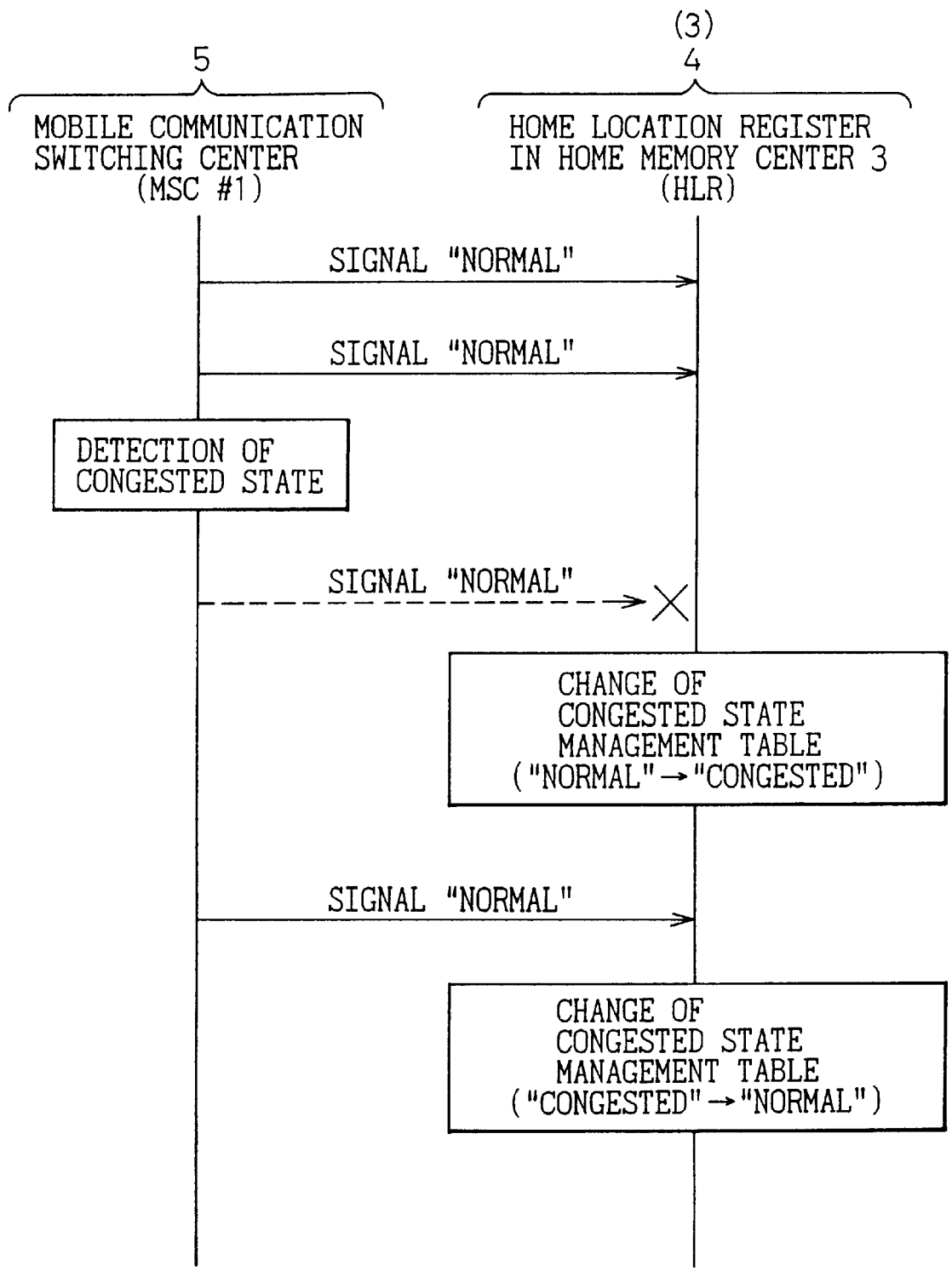

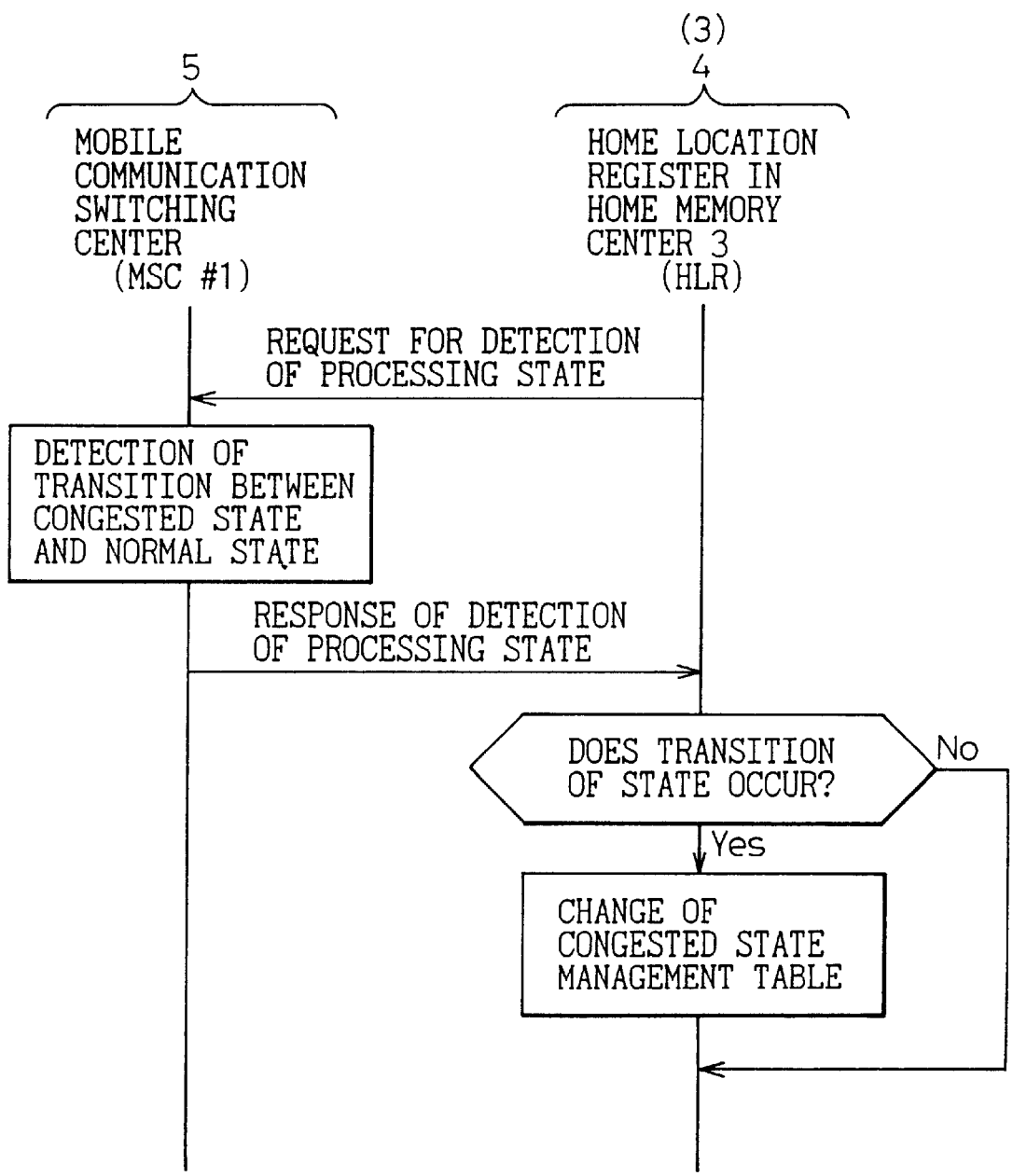

Fig.5

SUBSCRIBER PRIORITY INFORMATION TABLE /8

| SUBSCRIBER | TELEPHONE NUMBER | SERVICES | ORDER OF PRIORITY (1[LOW]~5[HIGH]) |
|---|---|---|---|
| SUBSCRIBER A | XXX-0001 | — | 2 |
| SUBSCRIBER B | XXX-0002 | — | 4 |
| SUBSCRIBER C | XXX-0003 | — | 2 |
| SUBSCRIBER D | XXX-0004 | — | 2 |

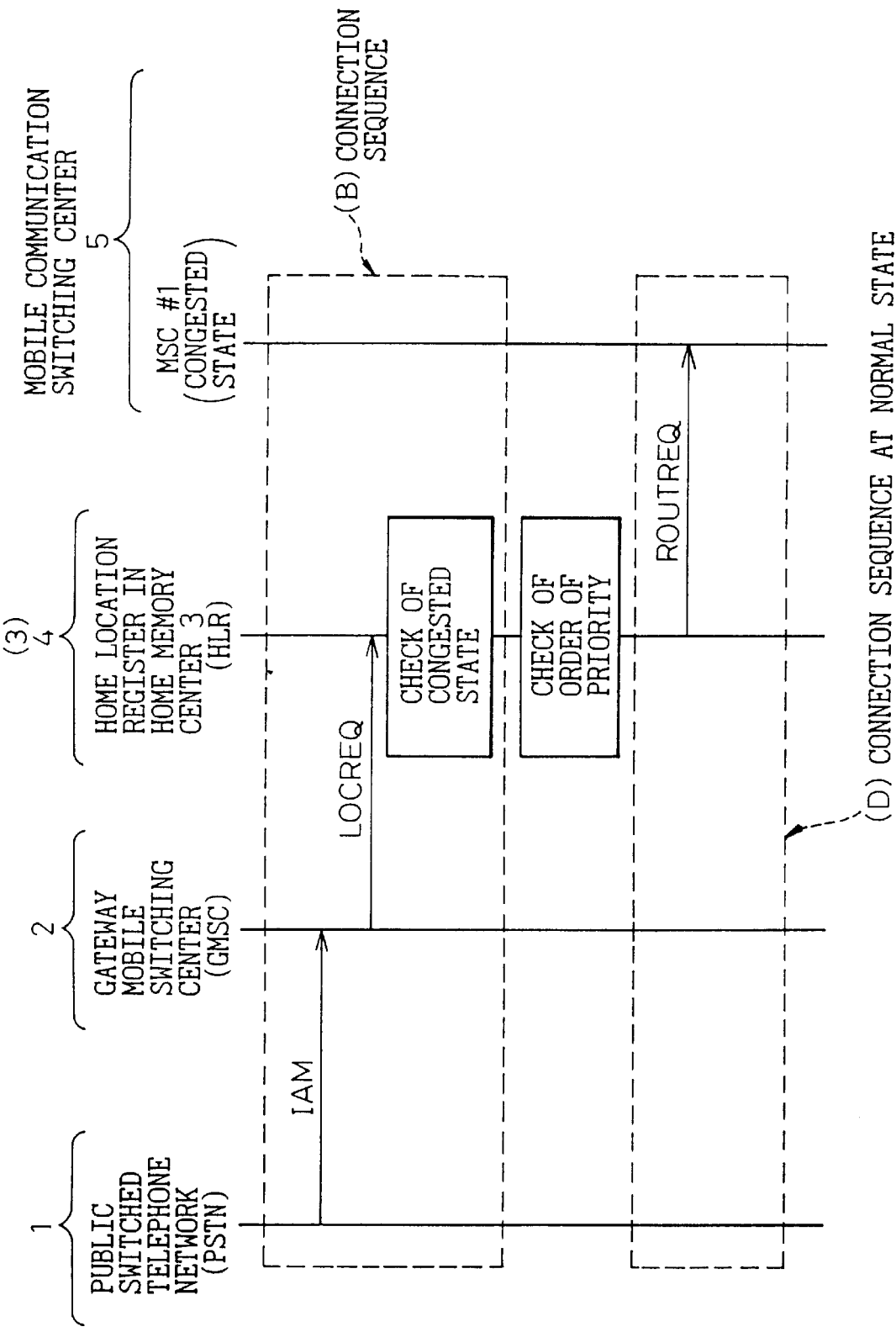

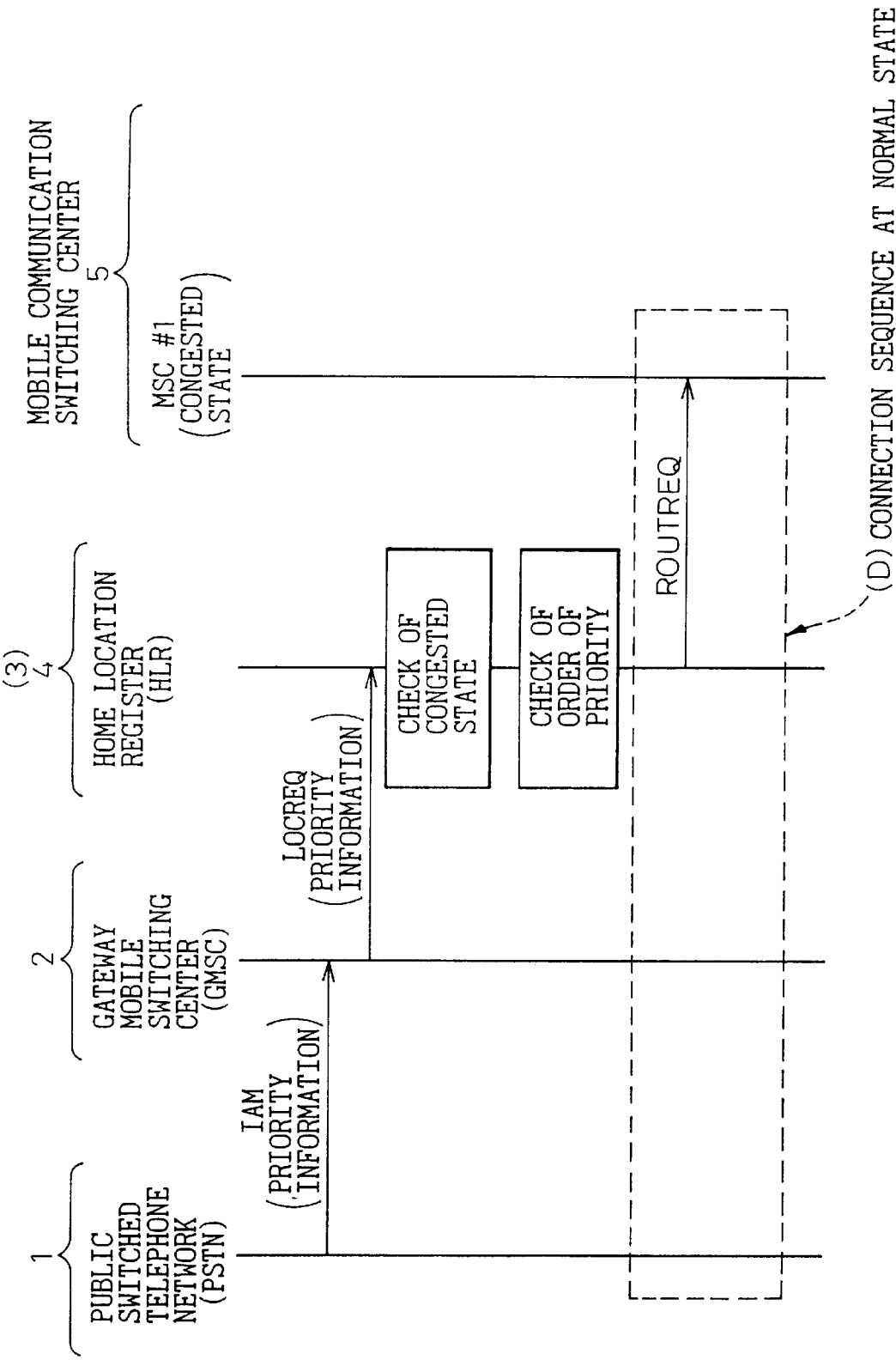

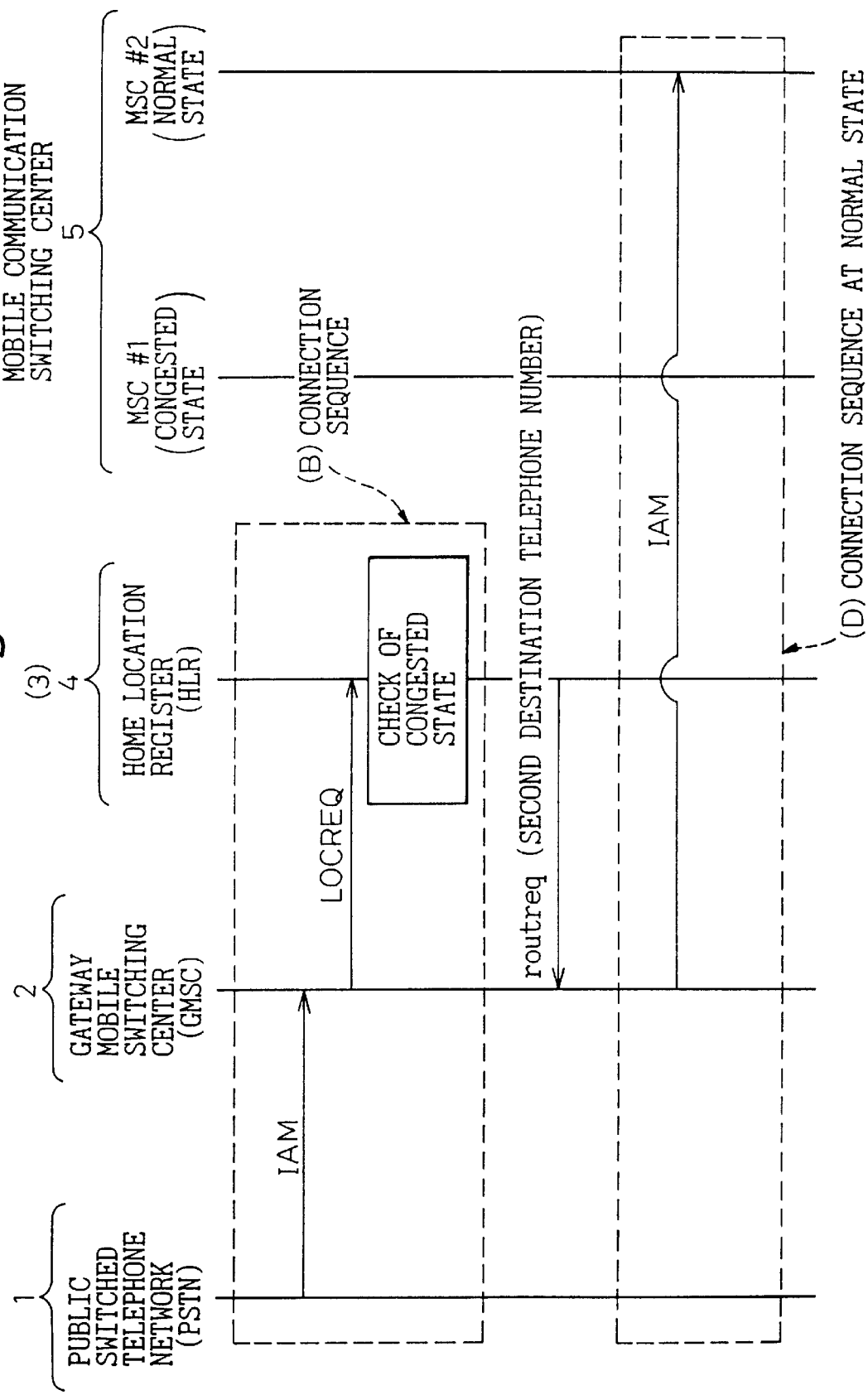

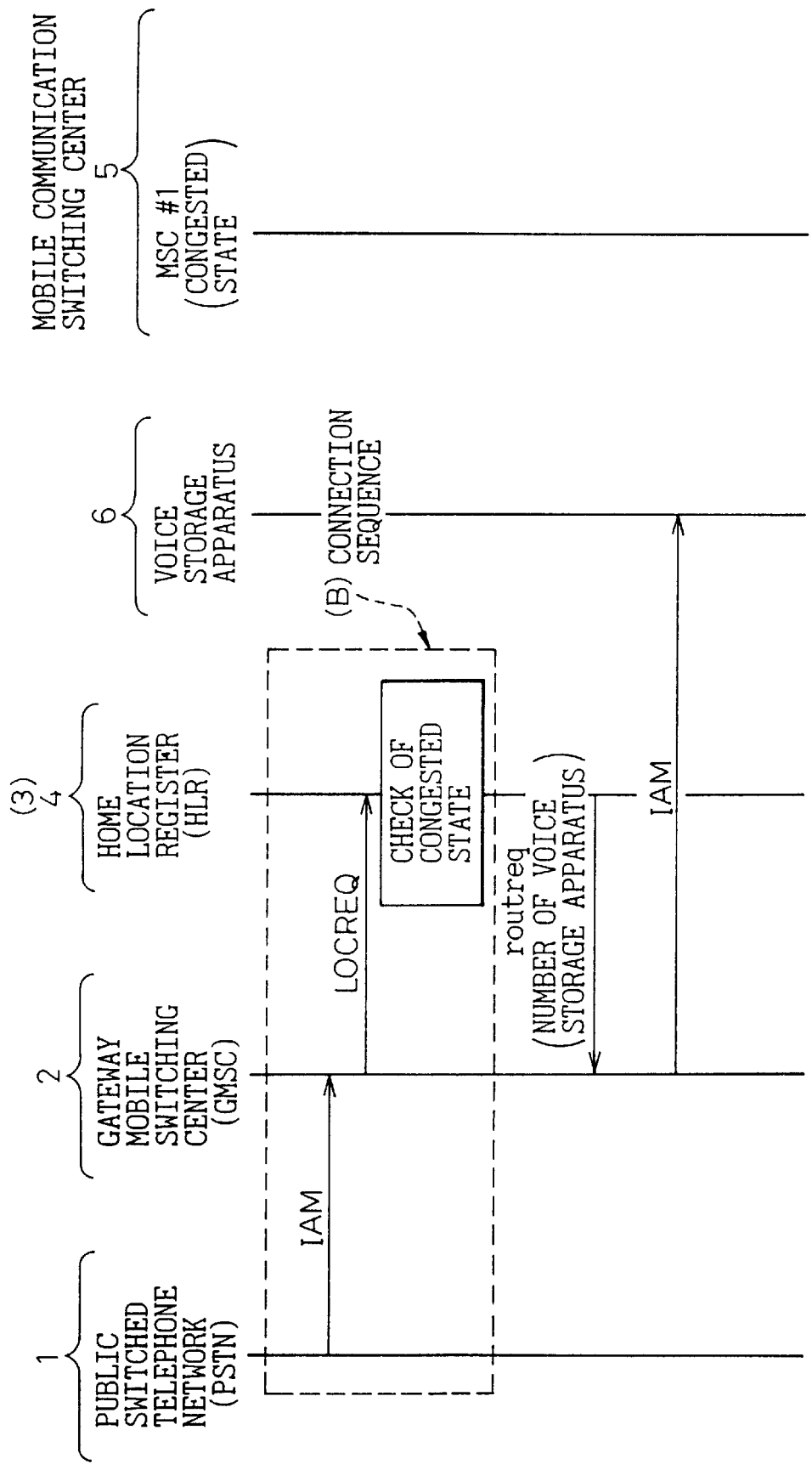

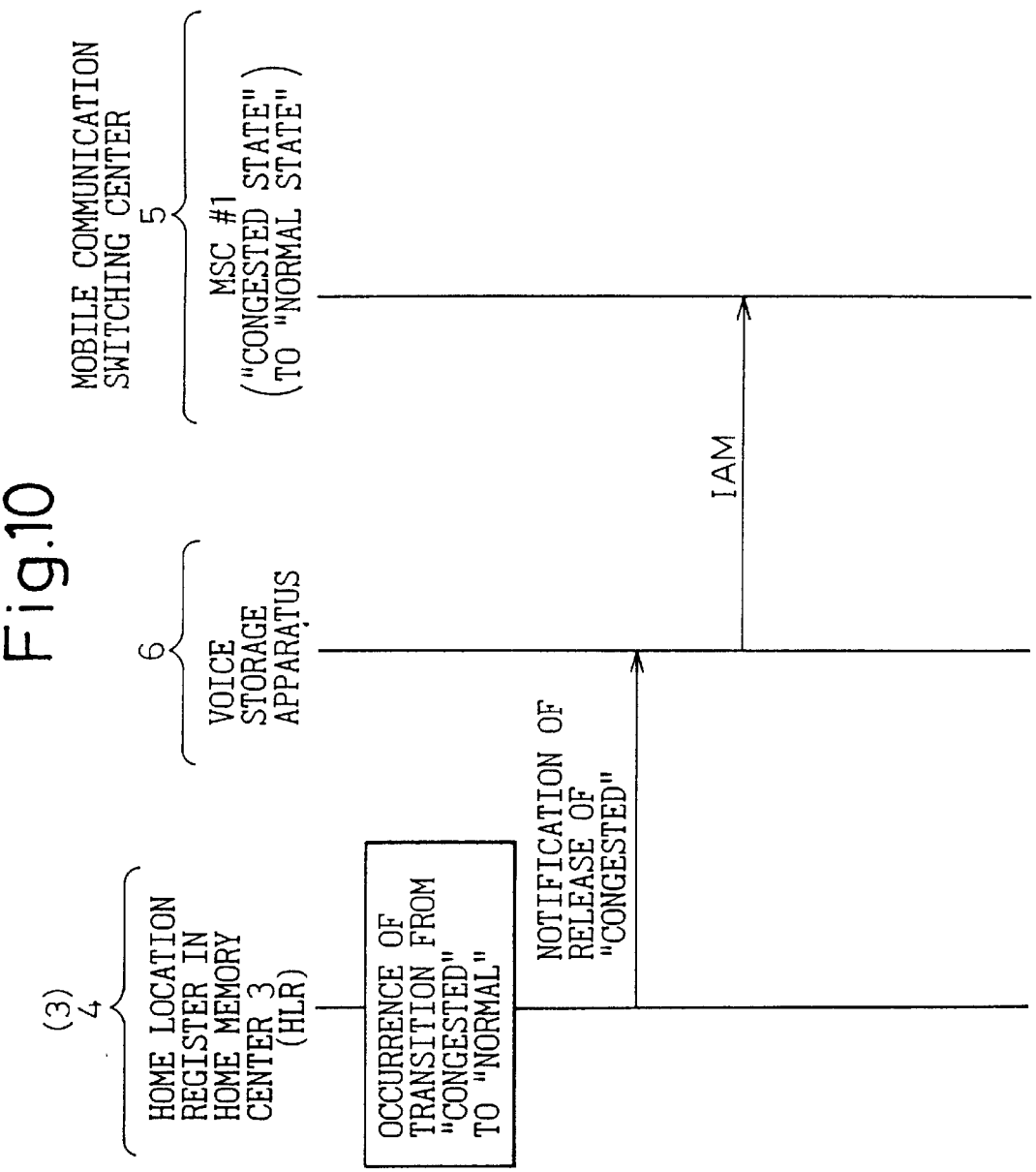

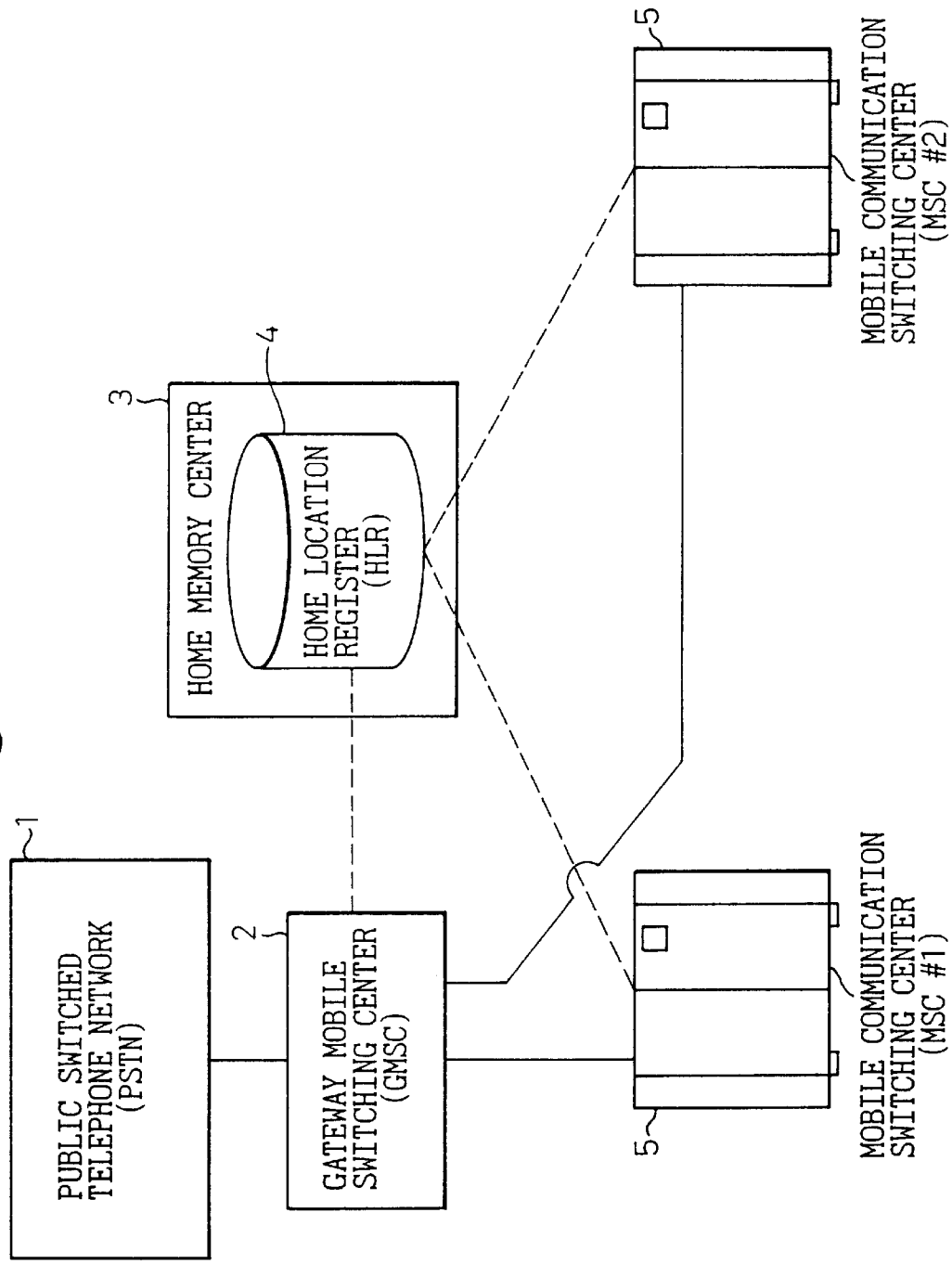

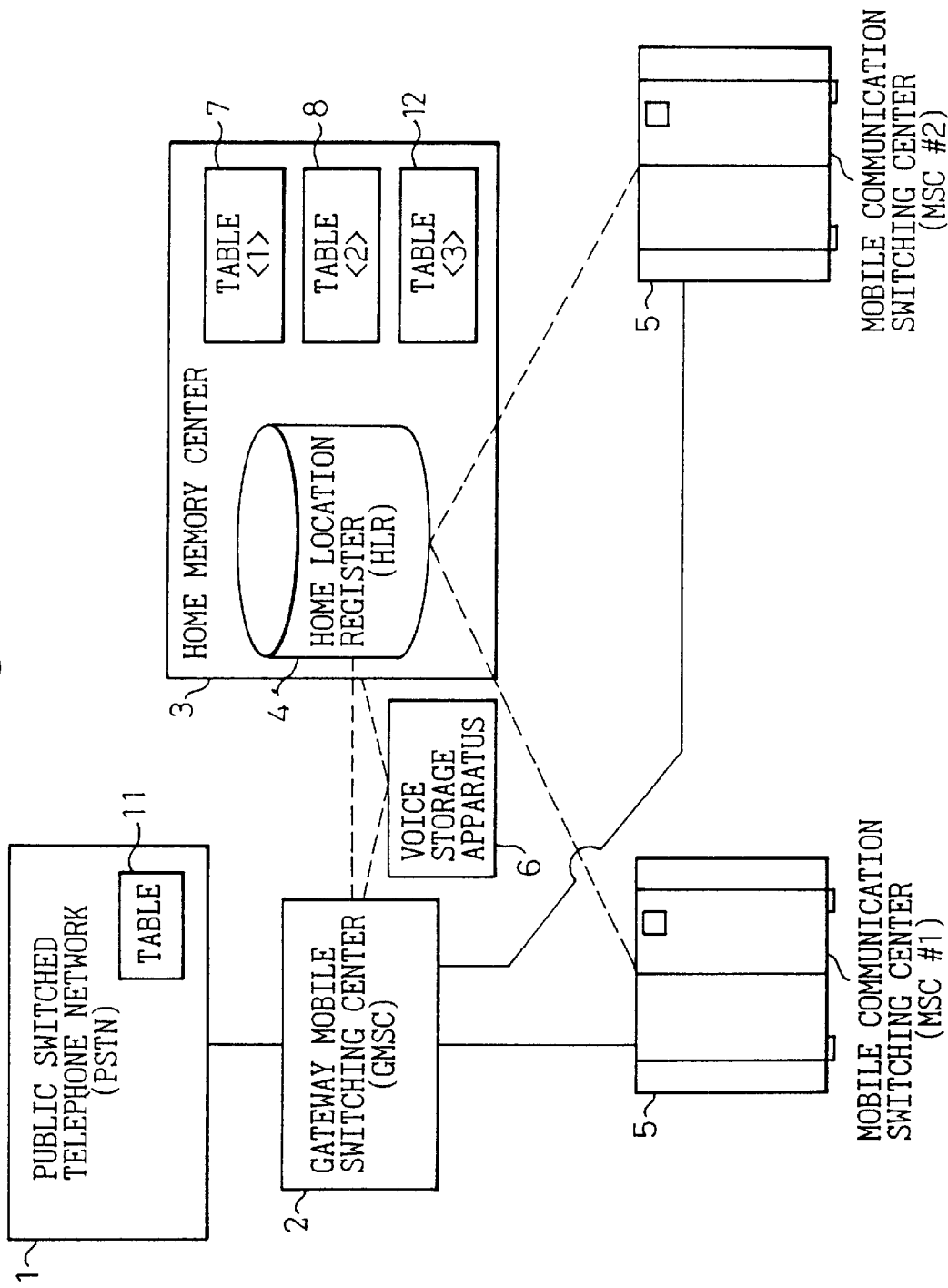

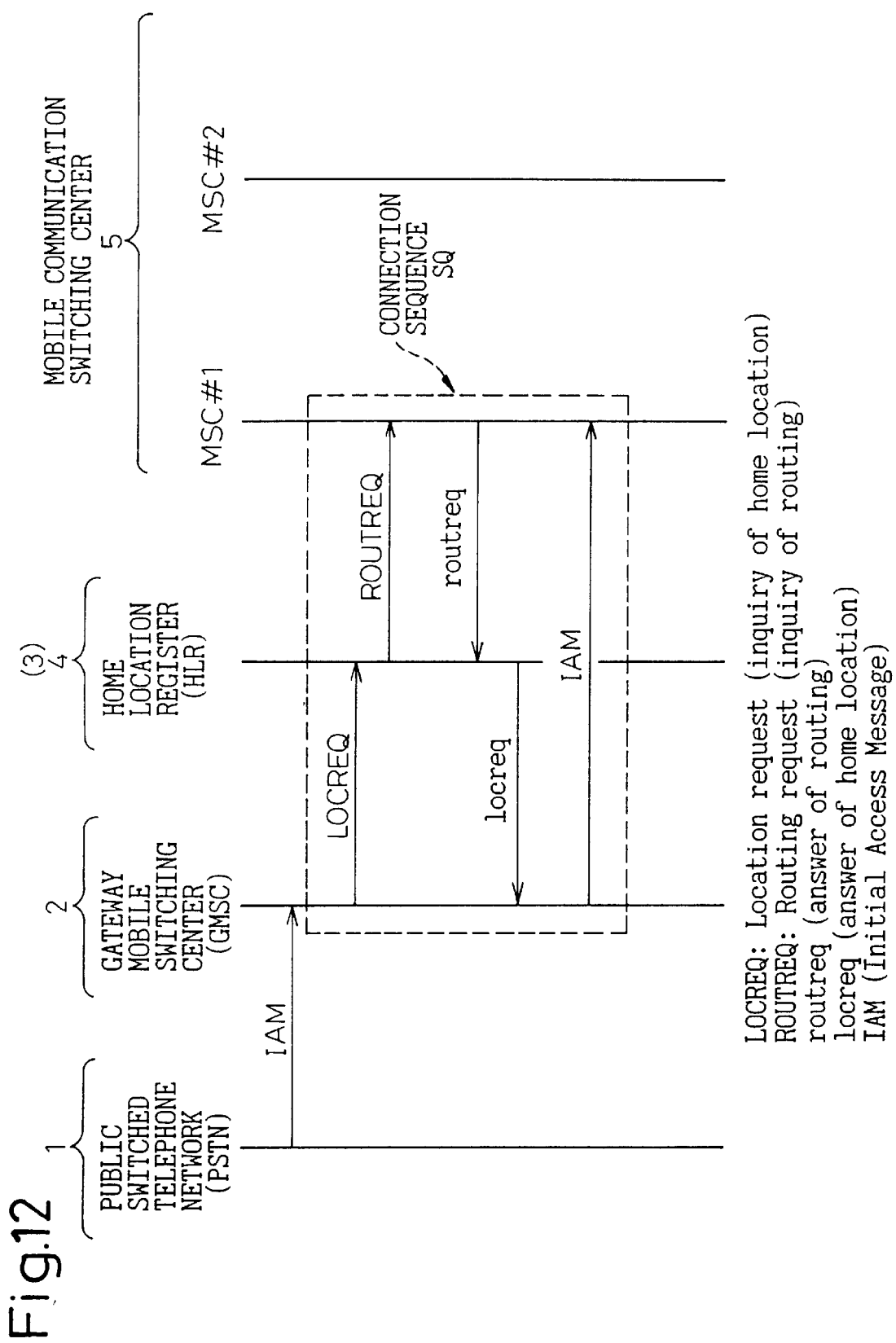

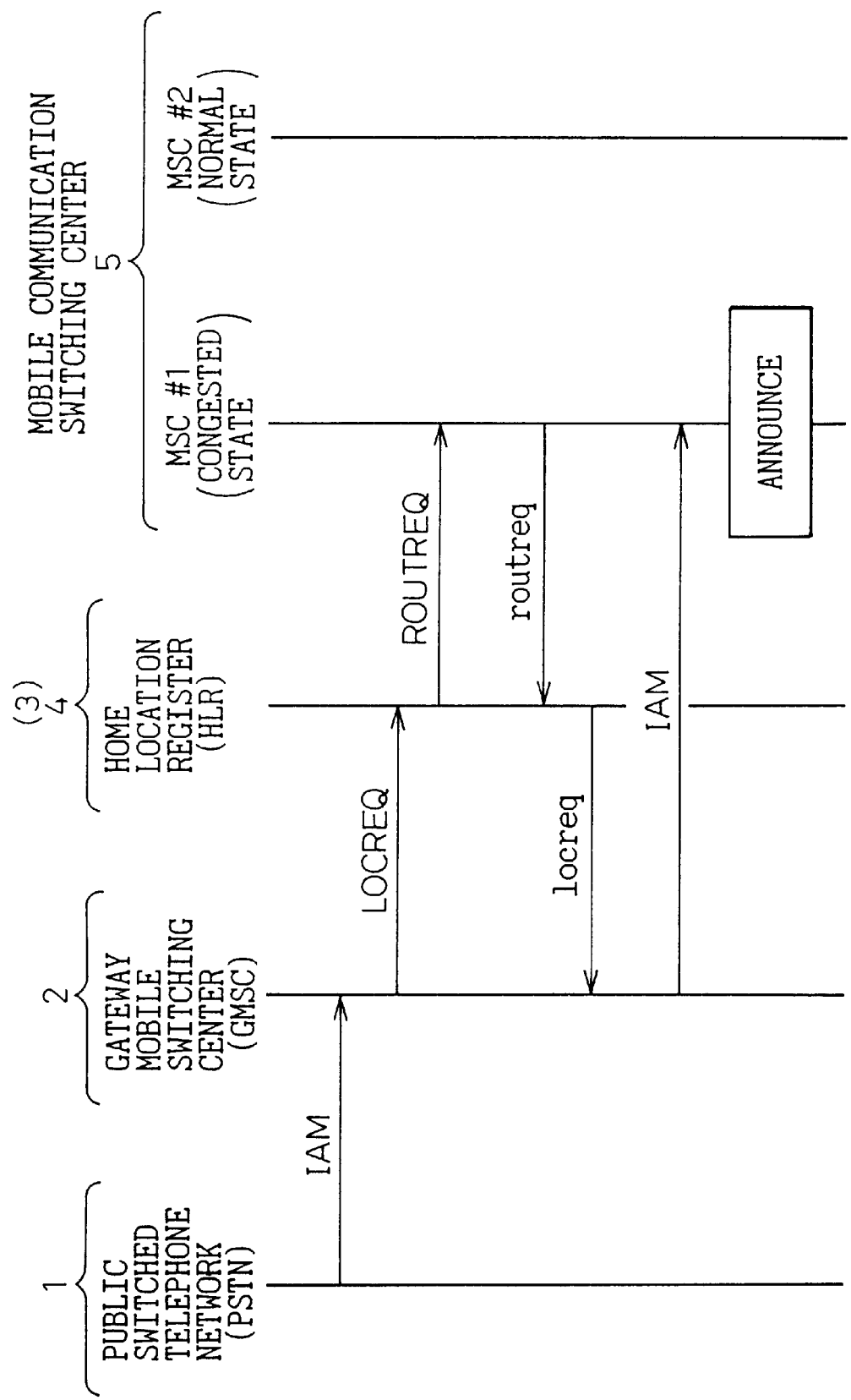

METHOD AND APPARATUS FOR CONTROLLING THE RESTRICTION ON TRAFFIC IN MOBILE COMMUNICATION SYSTEM

BACKGROUND OF THE INVENTION

1. Field of the Invention

The present invention relates to a method and apparatus for controlling the restriction on traffic in a mobile communication system, when congestion occurs in the mobile communication network, which restricts processing for switching in mobile communications and controls the system so as to connect speech channels between switching centers in accordance with the restrictions.

2. Description of the Related Art

As will be explained in detail later with reference to the drawings, in a conventional connection sequence in processing for switching in mobile communications at times of congestion in a mobile communication system, it was not possible for a home memory center to detect, before executing processing by a routing request (ROUTREQ), in advance the fact that the destination mobile communication switching center was congested, obtained from previous processing by a location request (LOCREQ). For this reason, at the time of congestion, almost all of the processing for switching in mobile communication, performed after the processing due to the location request (LOCREQ) at the home memory center, became wasted and there was a problem that the time for the processing for the switching in mobile communication was increased—resulting in inefficiency.

Further, when it is not possible for a caller to connect to a destination mobile terminal due to congestion, the caller can only operate the call originating terminal to try to call again if he wants to communicate with the destination mobile terminal. For this reason, there is a possibility that the caller would have to operate the call originating terminal many times in order to place the call, so the operation becomes troublesome. Further, there was another problem in that, at the time of congestion, a caller could not communicate with a destination mobile terminal even if desiring, in an emergency, to talk with the other party at all costs.

SUMMARY OF THE INVENTION

The present invention was made in consideration with the above problems and has as its object to provide a method and apparatus for controlling the restriction on traffic in a mobile communication system enabling an efficient mobile communication system with little wasted processing.

To attain the above object, according to an aspect of the present invention, there is provided an apparatus for controlling the restriction on traffic in a mobile communication system including a report means, provided in a mobile communication switching center, for reporting a processing state indicating a congested state or a normal state to a management center in advance; a management means, provided in the management center, for managing the processing states of all mobile communication switching centers based on reports of the processing states; a notifying means, provided in the management center, for investigating by the management means the processing state of a destination mobile communication switching center in response to a request for a location of a destination corresponding to a call from a gateway mobile switching center and notifying the gateway mobile switching center that, when in a congested state, the processing state is a congested state; and a control means, provided in the gateway mobile switching center, for controlling the system so that, when receiving a notification of a congested state, the gateway mobile switching center does not connect a speech channel to a mobile communication switching center in a congested state, whereby an efficient mobile communication system with little wasted processing can be realized.

BRIEF DESCRIPTION OF THE DRAWINGS

The above object and features of the present invention will be more apparent from the following description of the preferred embodiments given with reference to the accompanying drawings, wherein:

FIG. 1 is a view of a congested state-management table in an apparatus according to an embodiment of the present invention;

FIGS. 2A and 2B are sequence diagrams of a mobile communication system according to a first embodiment of the present invention;

FIG. 3 is a sequence diagram of table change in a mobile communication system according to a second embodiment of the present invention;

FIG. 4 is a sequence diagram of table change in a mobile communication system according to a third embodiment of the present invention;

FIG. 5 is a view of a subscriber priority information table in an apparatus according to an embodiment of the present invention;

FIG. 6 is a sequence diagram of preferential connection in a mobile communication system according to a fourth embodiment of the present invention;

FIG. 7 is a sequence diagram of preferential connection in a mobile communication system according to a fifth embodiment of the present invention;

FIG. 8 is a sequence diagram of call forwarding in a mobile communication system according to a sixth embodiment of the present invention;

FIG. 9 is sequence diagram of a telephone answering service in a mobile communication system according to a seventh embodiment of the present invention;

FIG. 10 is a sequence diagram of a telephone answering and call forwarding service in a mobile communication system according to the seventh embodiment of the present invention;

FIG. 11A is a view of the overall configuration of a general mobile communication network of the related art; and FIG. 11B is a view of the overall configuration of a mobile communication network according to an embodiment of the present invention;

FIG. 12 is a sequence diagram of connection in a mobile communication system of the related art; and FIG. 13 is a sequence diagram of connection at the time of congestion in a mobile communication system of the related art.

DESCRIPTION OF THE PREFERRED EMBODIMENTS

Before describing the embodiments of the present invention, the related art and the disadvantages therein will be described with reference to the related figures.

FIG. 11A shows a general switching network of the related art, as a whole, comprising a mobile communication network and a public switched telephone network. This mobile communication network also has a control channel network (shown by broken lines in the figure) laid together with the speech channels (shown by solid lines in the figure). It is constituted by a public switched telephone network (PSTN) 1 for connecting speech channels with any numerous public terminals, a mobile transit switching center, in more detail, a gateway mobile switching center (GMSC) 2 for connecting the public switched telephone network 1 and the mobile communication network with each other, a home memory center 3 managing the locations of the mobile terminals for every home location registration area, a home location register (HLR) 4 provided in the home memory center 3 and in which location information etc. are registered as the contents of the destinations, a plurality of mobile communication switching centers (MSC) 5, i.e., #1 and #2 (here, only two mobile communication switching centers are illustrated, but in actuality, there are a plurality of mobile communication switching centers) for performing the mobile communication switching processing by respective CPU's etc., a plurality of radio base stations (not illustrated) accommodated in each of the mobile communication switching centers 5, and a plurality of mobile terminals (not illustrated) for performing radio communications with these radio base stations.

Here, the mobile communication network of the related art will be explained in brief.

In this mobile communication network, when a call originating terminal (not illustrated) calls to communicate through a switching network with a destination mobile terminal (not illustrated), first the call originating terminal calls and connects the speech channel to the public switched telephone network 1. The public switched telephone network 1 connects the speech channel to the gateway mobile switching center 2 corresponding to the call. The gateway mobile switching center 2 requests the destination corresponding to that call to the home memory center 3 via a control channel network. The home memory center 3 searches for the destination mobile communication switching center from among a plurality of mobile communication switching centers 5 by the home location register 4, and answers that the obtained destination is a mobile communication switching center 5 (for example, #1) to the gateway mobile switching center 2. Next, the gateway mobile switching center 2 connects the speech channel to the destination mobile communication switching center #1 which was answered in the request with the home memory center 3. The mobile communication switching center #1 to which this speech channel is connected connects the radio channel to the destination mobile terminal via the radio base station to perform the communication.

[Sequence Control of Mobile Communication System of Related Art]

FIG. 12 shows an example of the conventional processing for switching in mobile communication in a mobile communication system accommodating mobile terminals and mainly shows the processing between the switching centers (between the gateway mobile switching center 2 and for example the mobile communication switching center #1) by the connection sequence (indicated by a broken line box SQ in the figure). The processing between the gateway mobile switching center 2 and the mobile communication switching center #1 by this connection sequence SQ includes processing for data transfer to connect a speech channel between the two and processing for channel connection for connecting a speech channel between switching centers based on this data transfer processing. In this data transfer processing, the speech channel is connected by transferring channel control data concerning a later explained location request (LOCREQ), routing request (ROUTREQ), routing request response (routreq), and location request response (locreq). Further, in the channel connection processing, the speech channel is connected by transferring channel connection data concerning an initial address message (IAM) etc.

Specifically, this happens as follows. The home location register 4 inside the home memory center 3 has registered in it, as the data for the mobile communications, the location information of the subscribers etc. By this location information, a destination mobile communication switching center in whose area the destination mobile terminal exists is designated and the mobile communication switching center communicates with the destination mobile terminal via the radio base station.

In this mobile communication, the caller operates the call originating terminal to call up to the public switched telephone network 1. The public switched telephone network 1 connects the speech channel by transferring the channel connection data such as the initial address message (IAM) to the gateway mobile switching center 2 according to the connection sequence SQ. Subsequently, the gateway mobile switching center 2 requests the location of the destination mobile terminal corresponding to the call to the home memory center 3 (location request (LOCREQ)). The home memory center 3 investigates the destination mobile communication switching center by the home location register 4 and requests whether the routing to the destination mobile terminal via the radio base station corresponding to the request is possible or not to the obtained mobile communication switching center 5 (for example #1) (routing request (ROUTREQ)). The possibility of the routing to the destination mobile terminal via the radio base station is returned from the mobile communication switching center #1 (routing request response (routreq)). The destination mobile communication switching center #1 corresponding to the response is returned to the gateway mobile switching center 2 (location request response (locreq)). The gateway mobile switching center 2 connects the speech channel by transferring the channel connection data such as the initial address message (IAM) to the mobile communication switching center #1 responded. The mobile communication switching center #1 connects the radio channel to the destination mobile terminal via the radio base station by a usual method according to a basic call termination sequence (not illustrated).

In the mobile communication switching center performing such mobile communication of the related art, however, there is a limit in the processing capability due to the memory capacity of the CPU and so on. For this reason, if more than the processing capability of the channel connection, inquiries, and other processing requests become jammed, the probability of occurrence of the congested state is high.

FIG. 13 shows the conventional processing for switching in mobile communication in the congested state in such a mobile communication system. In the figure, since it is not known in advance that the destination mobile communication switching center is in a congested state, the gateway mobile switching center 2 connects the speech channel to the destination mobile communication switching center returned by the processing for the location request response (locreq). However, even if the mobile communication switching center 5 (for example #1 intends to connect the radio channel to the destination mobile terminal via the radio base station, the radio channel cannot be newly connected if the system is in a congested state. Thus the mobile communication switching center #1 detect the congested state by this.

Therefore, at the time of congestion, the mobile communication switching center #1 transfers speech data for announcing that the system is congested, for example "The lines are now busy and it is hard to get through. Please call again a little while later." to the call originating terminal by utilizing the speech channel which has been already connected from the call originating terminal to the public switched telephone network 1 via the gateway mobile switching center 2. Thereafter, the mobile communication switching center #1 disconnects the speech channel and terminates the processing via the gateway mobile switching center 2 although the speech channel has been connected.

Summarizing again the problems to be solved by the invention, as mentioned above, in the connection sequence in the processing for switching in mobile communications at the time of congestion (FIG. 13) in a mobile communication system of the related art, it was not possible for a home memory center 3 to detect, before executing processing by a routing request (ROUTREQ), in advance the fact that the destination mobile communication switching center was congested, obtained from previous processing by a location request (LOCREQ). For this reason, at the time of congestion, almost all of the processing for switching in mobile communication, performed after the processing due to the location request (LOCREQ) at the home memory center 3, became wasted and there was the above-mentioned problem that the time for the processing for the switching in mobile communication was increased—resulting in inefficiency.

Further, when it is not possible for a caller to connect to a destination mobile terminal due to congestion, the caller can only operate the call originating terminal to try to call again if he wants to communicate with the destination mobile terminal. For this reason, there is a possibility that the caller would have to operate the call originating terminal many times in order to place the call, so the operation becomes troublesome. Further, there was the above-mentioned other problem in that, at the time of congestion, a caller could not communicate with a destination mobile terminal even if desiring, in an emergency, to talk with the other party at all costs.

The present invention provides, in view of the above problem, a method and apparatus for controlling the restriction on traffic in a mobile communication system enabling an efficient mobile communication system with little wasted processing. This will be explained in detail below.

To solve the above problems, according to a first aspect of the present invention, there is provided a method for controlling the restriction on traffic in a mobile communication system, where, in mobile communications where a call originating terminal calls and connects with a destination mobile terminal through a switching network, the call originating terminal calls up and connected a speech channel to a gateway mobile switching center, the gateway mobile switching center requests a destination to be connected to the call to a management center managing the locations of mobile terminals, the management center investigates the destination mobile communication switching center from among a plurality of mobile communication switching centers and responds with the destination mobile communication switching center obtained by the investigation to the gateway mobile switching center, the gateway mobile switching center connects the speech channel to the responded destination mobile communication switching center, and the mobile communication switching center connects the radio channel to the destination mobile terminal via a radio base station, the method comprising: having the mobile communication switching center report a processing state of a congested state or a normal state to the management center in advance; having the management center manage the processing states of the mobile communication switching centers based on the reports of the processing states; having the management center investigate the processing state of a destination mobile communication switching center in response to a request, from the gateway mobile switching center, for the location of a destination to be connected to the call; and controlling such that, when the processing state is the congested state, the gateway mobile switching center does not connect a speech channel to the mobile communication switching center in the congested state.

In this way, since it is known in advance that the mobile communication switching center in whose area the destination mobile terminal exists is in a congested state by utilizing the management center inherent in the mobile communication system, a speech channel is prevented from being wastefully connected to a mobile communication switching center in the congested state by the gateway mobile switching center and it is possible to reduce the time for processing for switching in mobile communication by this amount.

According to a second aspect of the present invention, there is provided a method for controlling the restriction on traffic in a mobile communication system of the first aspect, wherein the mobile communication switching center reports its processing state, that is, the congested state or the normal state, to the management center when the state shifts to the congested state or normal state and the management center manages the processing states of mobile communication switching centers based on the reports of processing states.

According to a third aspect of the present invention, there is provided a method for controlling the restriction on traffic in a mobile communication system of the first aspect, wherein the mobile communication switching center periodically reports one processing state to the management center when the processing state is either the congested state or the normal state and the management center manages processing states of the mobile communication switching centers to change a processing state to another processing state when the report of said one processing state is not periodically made from the mobile communication switching center.

Due to this, the management center can manage a processing state just by detecting that a report of the processing state is not periodically made from the mobile communication switching center.

According to a fourth aspect of the present invention, there is provided a method for controlling the restriction on traffic in a mobile communication system of the first aspect, wherein the management center cyclically inquires about processing states to mobile communication switching centers and manages, when the processing states are returned from the mobile communication switching centers, the processing states of the mobile communication switching centers based on the returned reports of the processing states.

Due to this, a mobile communication switching center need only report its processing state when there is an inquiry on its processing state from the management center, therefore the processing load of the mobile communication switching center can be reduced.

According to a fifth aspect of the present invention, there is provided a method for controlling the restriction on traffic in a mobile communication system of the first aspect, wherein control is carried out so that the management center assigns a priority order to a destination mobile terminal in advance and, when the priority order of the destination mobile terminal is high, even if the destination mobile communication switching center is in a congested state, notifies the mobile communication switching center in the congested state as the destination to the gateway mobile switching center and so that the gateway mobile switching center connects the speech channel to the notified mobile communication switching center.

Due to this, since a destination mobile terminal having a high priority order will connect a speech channel to the mobile communication switching center, even if the mobile communication switching center is in a congested state, and try to connect to the destination mobile terminal, it is possible to avoid as much as possible having to operate the call originating terminal several times to place a call.

According to a sixth aspect of the present invention, there is provided a method for controlling the restriction on traffic in a mobile communication system of the first aspect, wherein control is carried out so that the management center assigns a priority order to a call originating terminal in advance and, when the priority order of the call originating terminal is high, even if the destination mobile communication switching center is in the congested state, notifies the mobile communication switching center in the congested state as the destination to the gateway mobile switching center and so that the gateway mobile switching center connects the speech channel to the notified mobile communication switching center.

Due to this, since a call originating terminal having a high priority order will connect a speech channel to the mobile communication switching center, even if the mobile communication switching center is in a congested state, and try to connect to the destination mobile terminal, it is possible to avoid as much as possible having to operate the call originating terminal several times to place a call.

According to a seventh aspect of the present invention, there is provided a method for controlling the restriction on traffic in a mobile communication system of the first aspect, wherein control is carried out so that the management center determines a forwarding terminal as terminal information in advance for a destination mobile terminal and, when the mobile communication switching center in whose area the destination mobile terminal exists is in a congested state, notifies the terminal information to the gateway mobile switching center and the gateway mobile switching center connects the speech channel to the mobile communication switching center to which the forwarding terminal belongs based on the terminal information.

Due to this, at the time of congestion, even in the case where the mobile communication switching center in whose area the destination mobile terminal with which the caller wants to speak is congested, the caller can speak with another mobile terminal or the like in place of the destination mobile terminal.

According to an eighth aspect of the present invention, there is provided a method for controlling the restriction on traffic in a mobile communication system of the first aspect, wherein the management center notifies the gateway mobile switching center of a voice storage apparatus for storing a message as the destination in place of the mobile communication switching center in the congested state, the gateway mobile switching center connects a speech channel to the destination voice storage apparatus according to the notification, and the voice storage apparatus stores the voice message of the caller.

Due to this, once storing the content desired to be sent at the time of congestion in the voice storage apparatus, the content desired to be sent can be heard by the destination mobile terminal later.

According to a ninth aspect of the present invention, there is provided a method for controlling the restriction on traffic in a mobile communication system of the eighth aspect, wherein the management center reports that the processing state has returned to a normal state to the voice storage apparatus when the processing state of the destination mobile communication switching center shifts from a congested state to a normal state and the voice storage apparatus automatically forwards, in response to the report, the message to the mobile communication switching center which has returned to a normal state.

Due to this, it is possible to avoid having to perform an operation at the destination mobile terminal for listening to the content stored in the voice storage apparatus and desired to be conveyed at the time of congestion.

According to a 10th aspect of the present invention, there is provided an apparatus for controlling the restriction on traffic in a mobile communication system, where, in mobile communications where a call originating terminal calls and connects with a destination mobile terminal through a switching network, the call originating terminal calls up and connected a speech channel to a gateway mobile switching center, the gateway mobile switching center requests a destination to be connected to the call to a management center managing the locations of mobile terminals, the management center investigates the destination mobile communication switching center from among a plurality of mobile communication switching centers and responds with the destination mobile communication switching center obtained by the investigation to the gateway mobile switching center, the gateway mobile switching center connects the speech channel to the responded destination mobile communication switching center, and the mobile communication switching center connects the radio channel to the destination mobile terminal via a radio base station, the apparatus comprising: a report means provided in the mobile communication switching center for reporting a processing state, i.e., a congested state or a normal state, to the management center in advance; a management means provided in the management center for managing the processing states of the mobile communication switching centers based on the reports of the processing states; a notifying means provided in the management center for checking, based on the management means, a processing state of a destination mobile communication switching center corresponding to an inquiry, from the gateway mobile switching center, on the location of a destination corresponding to a call and notifying its congested state to the gateway mobile switching center when the processing state is a congested state; and a control means provided in the gateway mobile switching center for controlling the gateway mobile switching center so that, when receiving.the notification of the congested state, it does not connect a speech channel to the mobile communication switching center in the congested state.

In this way, since it is known in advance that the mobile communication switching center in whose area the destination mobile terminal exists is in a congested state by utilizing the management center inherent in the mobile communication system, the gate mobile switching center does not needlessly connect a speech channel to a mobile communication switching center in the congested state and it is possible to reduce the time for processing for switching in mobile communication by this amount.

According to an 11th aspect of the present invention, there is provided an apparatus for controlling the restriction on traffic in a mobile communication system of the 10th aspect, wherein: the report means reports a processing state, i.e., a congested state or a normal state, to the management center when the state shifts to the congested state or the normal state and the management means manages the processing states of the mobile communication switching centers based on the reports of processing states.

According to a 12th aspect of the present invention, there is provided an apparatus for controlling the restriction on traffic in a mobile communication system of the 10th aspect, wherein: the report means periodically reports one processing state to the management center when the processing state is either the congested state or the normal state and the management center manages processing states of the mobile communication switching centers to change a processing state to another processing state when the report of said one processing state is not periodically made from the mobile communication switching center.

Due to this, the management center can manage the processing state by just detecting that a report of the processing state is not periodically made from the mobile communication switching center.

According to a 13th aspect of the present invention, there is provided an apparatus for controlling the restriction on traffic in a mobile communication system of the 10th aspect, wherein the management means cyclically inquires about the processing states to the mobile communication switching centers and manages, when the processing states are returned from the mobile communication switching centers, the processing states of the mobile communication switching centers based on the returned reports of the processing states.

Due to this, a mobile communication switching center need only report its processing state when there is an inquiry on its processing state from the management center, therefore the processing load of the mobile communication switching center can be reduced.

According to a 14th aspect of the present invention, there is provided an apparatus for controlling the restriction on traffic in a mobile communication system of the 10th aspect, wherein control is carried out so that: the management center assigns a priority order to a destination terminal in advance and, when the priority order of the destination terminal is high, even if the destination mobile communication switching center is in the congested state, notifies the mobile communication switching center in the congested state as the destination to the gateway mobile switching center; and the gateway mobile switching center connects the speech channel to the notified mobile communication switching center.

Due to this, since a destination mobile terminal having a high priority order will connect a speech channel to the mobile communication switching center, even if the mobile communication switching center is in a congested state, and try to connect to the destination mobile terminal, it is possible to avoid as much as possible having to operate the call originating terminal several times to place a call.

According to a 15th aspect of the present invention, there is provided an apparatus for controlling the restriction on traffic in a mobile communication system of the 10th aspect, wherein control is carried out so that: the management center assigns a priority order to a call originating terminal in advance and, when the priority order of the call originating terminal is high, even if the destination mobile communication switching center is in the congested state, notifies the mobile communication switching center in the congested state as the destination to the gateway mobile switching center and the gateway mobile switching center connects the speech channel to the notified mobile communication switching center.

Due to this, since a call originating terminal having a high priority order will connect a speech channel to the mobile communication switching center, even if the mobile communication switching center is in a congested state, and try to connect to the destination mobile terminal, it is possible to avoid as much as possible having to operate the call originating terminal several times to place a call.

According to a 16th aspect of the present invention, there is provided an apparatus for controlling the restriction on traffic in a mobile communication system of the 10th aspect, wherein control is carried out so that: the management center determines a forwarding terminal as terminal information in advance for a destination mobile terminal and, when the mobile communication switching center in whose area the destination mobile terminal exists is in a congested state, notifies the terminal information to the gateway mobile switching center and the gateway mobile switching center connects the speech channel to the mobile communication switching center to which the forwarding terminal belongs based on the terminal information.

Due to this, even in a case where the mobile communication switching center in whose area the destination mobile terminal exits with which the caller wants to speak is congested, the caller can speak with another mobile terminal or the like in place of the destination mobile terminal.

According to a 17th aspect of the present invention, there is provided an apparatus for controlling the restriction on traffic in a mobile communication system of the 10th aspect, wherein: provision is made of a voice storage means for storing a voice message; when the mobile communication switching center in whose area the destination mobile terminal exists is in a congested state, the management center notifies the gateway mobile switching center of the voice storage means as the destination in place of the mobile communication switching center in the congested state; and the mobile communication switching center connects the speech channel to the destination voice storage means according to the notification.

Due to this, once storing the content desired to be sent in the voice storage apparatus at the time of congestion, the content desired to be sent can be heard by the destination mobile terminal later.

According to an 18th aspect of the present invention, there is provided an apparatus for controlling the restriction on traffic in a mobile communication system of the 17th aspect, wherein: the report means reports to the voice storage means that a processing state has returned to the normal state when the processing state of the destination mobile communication switching center shifts from the congested state to the normal state and the voice storage means automatically forwards the message to the mobile communication switching center which returned to the normal state according to the report.

Due to this, it is possible to avoid having to perform an operation at the destination mobile terminal for listening to the content which has been stored in the voice storage means at the time of congestion.

According to a 19th aspect of the present invention, there is provided a mobile communication switching center of a mobile communication system, where, in mobile communications where a call originating terminal calls and connects with a destination mobile terminal through a switching network, the call originating terminal calls up and connected a speech channel to a gateway mobile switching center, the gateway mobile switching center requests a destination to be connected to the call to a management center managing the locations of the mobile terminals, the management center investigates the destination mobile communication switching center from among a plurality of mobile communication switching centers and responds with the destination mobile communication switching center obtained by the investigation to the gateway mobile switching center, the gateway mobile switching center connects the speech channel to the responded destination mobile communication switching center, and the mobile communication switching center connects the radio channel to the destination mobile terminal via a radio base station, the mobile communication switching center provided with a report means for reporting its own processing state, i.e., a congested state or normal state, to the management center in advance.

Due to this, since the management center can determine that the mobile communication switching center in whose area the destination mobile terminal exists is in a congested state in advance, it is not necessary to request a routing to the destination mobile terminal and is possible to prevent the gateway mobile switching center from wastefully connecting a speech channel to a mobile communication switching center in a congested state.

According to a 20th aspect of the present invention, there is provided a management center of a mobile communication system where, in mobile communications where a call originating terminal calls and connects with a destination mobile terminal through a switching network, the call originating terminal calls up and connected a speech channel to a gateway mobile switching center, the gateway mobile switching center requests a destination to be connected to the call to a management center managing the locations of the mobile terminals, the management center investigates the destination mobile communication switching center from among a plurality of mobile communication switching centers and responds with the destination mobile communication switching center obtained by the investigation to the gateway mobile switching center, the gateway mobile switching center connects the speech channel to the responded destination mobile communication switching center, and the mobile communication switching center connects the radio channel to the destination mobile terminal via a radio base station, a provision is made of: a receiving means for receiving a report of a processing state, i.e., a congested state or normal state, from the mobile communication switching center; a management means for managing the processing states of the mobile communication switching centers based on the reports to the receiving means; and a notifying means for investigating the processing state of a destination mobile communication switching center corresponding to an inquiry, from the gateway mobile switching center, on the location of the destination to be connected to the call and, when the processing state is the congested state, notifying the gateway mobile switching center of the fact that the mobile communication switching center is in a congested state.

Due to this, since the management center can determine that the mobile communication switching center in whose area the destination mobile terminal exists is in a congested state in advance, it is not necessary to request a routing to the destination mobile terminal and is possible to prevent the gateway mobile switching center from wastefully connecting a speech channel to a mobile communication switching center in a congested state.

According to a 21st aspect of the present invention, there is provided a gateway mobile switching center of a mobile communication system, where, in mobile communications where a call originating terminal calls and connects with a destination mobile terminal through a switching network, the call originating terminal calls up and connected a speech channel to a gateway mobile switching center, the gateway mobile switching center requests a destination to be connected to the call to a management center managing the locations of the mobile terminals, the management center investigates the destination mobile communication switching center from among a plurality of mobile communication switching centers and responds with the destination mobile communication switching center obtained by the investigation to the gateway mobile switching center, the gateway mobile switching center connects the speech channel to the responded destination mobile communication switching center, and the mobile communication switching center connects the radio channel to the destination mobile terminal via a radio base station, a provision is made of: a receiving means for receiving from the management center a notification that the destination mobile communication switching center is in a congested state and a restricting means for preventing connection of a speech channel to a mobile communication switching center in a congested state according to the notification of the congested state.

Due to this, since the gate mobile switching center can determine that the mobile communication switching center in whose area the destination mobile terminal exists is in a congested state in advance, it is not necessary to wastefully connect a speech channel to a mobile communication switching center in a congested state and possible to reduce the time for processing for switching in mobile communications by that amount.

Below, specific embodiments of the present invention will be explained with reference to the drawings.

(1) First Embodiment

FIG. 11B shows a mobile communication network and a public switched telephone network according to an embodiment of the present invention. This mobile communication network has a control channel network laid together with speech channels. It is constituted by a public switched telephone network (PSTN) 1, a gateway mobile switching center 2 for connecting the public switched telephone network 1 and the mobile communication network with each other, a home memory center 3 managing the locations of the mobile terminals for every home location registration area, a home location register (HLR) 4 provided in the home memory center 3 and in which the location information of the destination is registered, a plurality of mobile communication switching centers (MSC) 5, i.e. #1, #2 . . . for performing mobile communication switching processing by respective CPU's etc., a plurality of radio base stations (not illustrated) for connecting the mobile communication switching centers 5 and the speech channels, and a plurality of mobile terminals (not illustrated) for engaging in radio communication with these radio base stations.

Each mobile communication switching center 5 (#1, #2 . . . ) is constituted so as to be able to detect a congested state (or normal state) and reports that it is in the congested state to the home memory center 3 by utilizing the control channel network. Here, the congested state means a state where a channel can no longer be connected since the rate of usage of the CPU rises or the like.

In the home memory center 3, as the content of the destination, in addition to the conventional location information etc., a congested state management table 7 is provided as well. Using this congested state management table 7, it is possible to determine in advance if each mobile communication switching center 5 (#1, #2, . . . ) is in a congested state (or normal state) in this mobile communication network.

[Congested State Management Table]

FIG. 1 shows an example of the configuration of the congested state management table. The congested state management table 7 shows the processing state of the mobile communication switching center 5 (#1, #2, . . . ) as "NORMAL" or "CONGESTED". This processing state is changed to congested or normal according to a report from a mobile communication centers 5, i.e., #1, #2, . . . .

Below, the operation of the method and apparatus of the first embodiment will be explained according to sequence diagram.

FIGS. 2A and 2B mainly show the operation sequences at the time of congestion in the mobile communication system of the first embodiment. This sequence is executed when the destination mobile communication switching center 5 becomes a congested state.

By executing this operation sequence, it can be determined in advance from the congested state management table 7 that the mobile communication switching center 5 in whose area the destination mobile terminal exists is in a congested state, whereby wasted connection of a speech channel to a mobile communication switching center in a congested state by the gateway mobile switching center 2 can be prevented.

[Table Change Sequence]

Specifically, referring to FIGS. 2A and 2B, according to the table change sequence (indicated by a broken line frame A in the figure) of this mobile communication network, when for example the mobile communication switching center #1 becomes a congested state (or normal state), the mobile communication switching center #1 detects that the processing state has shifted from the normal state to the congested state (or from the congested state to the normal state), supplies the result of the detection as the processing state data via the control channel network to the home memory center 3, and requests a change of the congested state management table 7 (FIG. 1) (request for change of congested state). The home memory center 3 changes the processing state of the mobile communication switching center #1 to "CONGESTED" (or "NORMAL") in the congested state management table 7 based on the data indicating the processing state and responds that it changed the state to the congested state (or normal state) to the mobile communication switching center #1 (response to change of congested state).

[Connection Sequence]

Next, an explanation will be made of the connection sequence (indicated by a broken line frame B in the figure) in the mobile communication network. When a caller calls the public switched telephone network 1 by operating the call originating terminal (not illustrated) (inputting the telephone number of the other party), the public switched telephone network 1 transfers the channel connection data such as the initial access message (IAM), call setup message, to the gateway mobile switching center 2 and connects the speech channel. Subsequently, the gateway mobile switching center 2 requests the location of the destination mobile terminal receiving the call to the home memory center 3 (location request LOCREQ). The home memory center 3 investigates the destination mobile communication switching center by the home location register 4 and refers the obtained mobile communication switching center, for example #1, to the congested state management table 7 (FIG. 1) to confirm in advance whether the processing state of the mobile communication switching center #1 is "NORMAL" or "CONGESTED" (check of congested state). When the mobile communication switching center #1 is in a congested state, the processing shifts to the congestion processing sequence (indicated by a broken line frame C in the figure).

[Congestion Processing Sequence]

At the time of congestion, the home memory center 3 does not perform processing by the congestion connection sequence (FIG. 13), where the gateway mobile switching center 2 connects a speech channel to the mobile communication switching center #1 in the congested state, carried out in the related art after the processing by a location request (LOCREQ). Instead, it responds that the destination mobile communication switching center #1 corresponding to the request (location request (LOCREQ)) is in a congested state to the gateway mobile switching center 2 (location request response (locreq)). The gateway mobile switching center 2 transfers speech data for announcing that the system is congested, for example "The lines are now busy and it is hard to get through. Please call again a little while later." to the call originating terminal by utilizing the speech channel which has been already connected from the call originating terminal via the public switched telephone network 1. Next, the gateway mobile switching center 2 disconnects the speech channel connected via the public switched telephone network 1 and terminates the processing.

[Normal Connection Sequence]

On the other hand, at the normal state, the home memory center 3 inquires whether the routing to the destination mobile terminal via the radio base station corresponding to the request is possible or not to the mobile communication switching center #1 (routing request (ROUTREQ)) in the connection sequence at the normal state (indicated by a broken line frame D in the figure) as explained in the related art and notifies the destination mobile communication switching center #1 corresponding to the response to the gateway mobile switching center 2 (location request response (locreq)) when it is answered from the mobile communication switching center #1 whether the routing to the destination mobile terminal via the radio base station is possible or not. The gateway mobile switching center 2 transfers the channel connection data such as the initial access message (IAM) to the responded mobile communication switching center #1 and connects the speech channel. The mobile communication switching center #1 connects the radio channel to the destination mobile terminal via the radio base station by the usual method according to the basic termination sequence (not illustrated).

(2) Second Embodiment

In the mobile communication network shown in FIG. 11B, each mobile communication switching center 5 (#1, #2, . . . ) detects its processing state ("NORMAL" or "CONGESTED") and periodically reports the normal (or congested) state to the home memory center 3 by utilizing the control channel network.

If a report of the processing state is not periodically made from a mobile communication switching centers #1, #2, . . . , the home memory center 3 changes the processing state of the mobile communication switching center, which does not periodically make the report, to "CONGESTED" in the congested state management table 7 (FIG. 1).

Below, an explanation will be made of the operation of the method and apparatus of the second embodiment according to a sequence diagram.

FIG. 3 shows the table change sequence in the mobile communication system of the second embodiment. This sequence is executed when the processing state is not reported from the destination mobile communication switching center.

[Table Change Sequence]

Specifically, by the table change sequence in this mobile communication network, when for example the mobile communication switching center (MSC) #1 is in a normal state, the mobile communication switching center #1 detects being normal state and periodically transmits its being normal as the signal "normal" via the control channel network to the home memory center 3. On the other hand, when the mobile communication switching center #1 becomes a congested state, the mobile communication switching center #1 suspends the transmission of this signal "normal". Therefore, when the signal "normal" which must be periodically input from the mobile communication switching center #1 is not input even after an elapse of a predetermined time, the home memory center 3 changes the processing state of the mobile communication switching center #1, from which signal "normal" was not input, to "CONGESTED" in the congested state management table 7 (FIG. 1).

When the mobile communication switching center #1 is finally released from the congested state, the mobile communication switching center #1 starts the transmission of the signal "normal" again. When the signal "normal" from the mobile communication switching center #1 is input again, the home memory center 3 changes the processing state of the mobile communication switching center #1 to "NORMAL" in the congested state management table 7 (FIG. 1).

(3) Third Embodiment

In the mobile communication network shown in FIG. 11B, the home memory center 3 periodically inquires about the processing state to each mobile communication switching center 5 (#1, #2, . . . ) by utilizing the control channel network. If the processing state obtained by this inquiry has shifted to the normal state or the congested state, the processing state ("NORMAL" or "CONGESTED") is changed in the congested state management table 7 (FIG. 1).

In the third embodiment, the mobile communication switching centers 5 (#1, #2, . . . ) do not constantly report the processing state as in the first and second embodiments, but report the processing state thereof only when there is an inquiry of the processing state from the home memory center 3.

Below, an explanation will be made of the operation of the method and apparatus of the third embodiment according to a sequence diagram.

FIG. 4 shows the table change sequence in the mobile communication system of the third embodiment. This sequence is executed when the home memory center 3 inquires about the processing state to each mobile communication switching center 5 (#1, #2, . . . )

[Table Change Sequence]

Specifically, in FIG. 4, the home memory center 3 repeatedly issues an inquiry for making each mobile communication switching center 5 (#1, #2, . . . ) detect its processing state via the control channel network at every predetermined time (request for detection of processing state). For example, when there is an inquiry from the home memory center 3, the mobile communication switching center #1 detects its processing state and responds with the processing state obtained as the result of this to the home memory center 3 (response of detection of processing state). The home memory center 3 checks whether the processing state has shifted to the normal state or the congested state and changes, when the state has shifted, the processing state of the mobile communication switching center to "CONGESTED" or "NORMAL" in the congested state management table 7 (FIG. 1).

(4) Fourth Embodiment

In the mobile communication network shown in FIG. 11B, the home memory center 3 is mounted with a subscriber priority information table 8 in addition to the location information of the related art and the congested state management table 7 of the first embodiment. By utilizing this subscriber priority information table, this mobile communication network provides preferential service at the time of congestion. In this preferential service at congestion, when a caller calls a destination mobile terminal, since there is also a possibility that, even if the destination mobile communication switching center 5 is in congested state, it will become possible to connect the channel due to a temporary decline in the usage rate of the CPU of the mobile communication switching center 5, and therefore, if this destination mobile terminal is provided with the preferential service at congestion, it is attempted to connect the speech channel to the mobile communication switching center 5. Due to this, even at congestion, connection can be achieved with the destination mobile terminal without carrying out the operation for calling from the call originating terminal many times.

[Subscriber Priority Information Table]

FIG. 5 shows an example of the configuration of the subscriber priority information table. The subscriber priority information table 8 shows the priority order (1 [low] to 5 [high]) determined for the telephone numbers corresponding to the destination mobile terminals (subscribers A, B, C, D, . . . ) subscribing to the preferential service at congestion.

Below, an explanation will be made of the operation of the method and apparatus of the fourth embodiment according to the sequence diagram.

FIG. 6 shows a preferential connection sequence in the mobile communication system of the fourth embodiment at the time of congestion. This sequence is executed when a caller calls from the call originating terminal to the public switched telephone network 1 at the time of congestion.

By executing this sequence, even if the mobile communication switching center 5 is in a congested state, when there is a call to a mobile terminal having a high priority order, the gateway mobile switching center 2 connects the speech channel to the mobile communication switching center 5. If the usage rate of the CPU of the mobile communication switching center 5 temporarily falls at this time, the speech channel to the destination mobile terminal can be connected.

[Connection Sequence]

Specifically, in FIG. 6, the caller inputs the telephone number of the other party-from the call originating terminal by the connection sequence (broken line frame B) and calls to the public switched telephone network 1. Note that, in the home memory center 3, the sequence until it is confirmed that the destination mobile communication switching center #1 for receiving this call is in the congested state is the same as that explained by using FIGS. 2A and 2B in the first embodiment.

Subsequently, at the home location register 4, the home memory center 3 refers the telephone number (for example xxx-0002) of the other party, when the caller calls by operating the terminal, to the subscriber priority information table 8 (FIG. 5), checks if the destination, for example, the mobile terminal (subscriber) B subscribes to the preferential service at congestion, checks the priority order of the mobile terminal B when it subscribes (priority order check), and when the result is that the priority order of the mobile terminal B (priority order 4 [high]) is high (for example, 3 or more is regarded as [high]), even if the destination mobile communication switching center #1 is in the congested state, shifts its processing to the normal connection sequence (indicated by the broken line frame D in the figure).

Subsequently, in the same way as that explained by using FIGS. 2A and 2B in the first embodiment, by the normal connection sequence (broken line frame D), the gateway mobile switching center 2 tries to connect the speech channel to the destination mobile communication switching center #1 in the congested state. At this time, even if the mobile communication switching center #1 is in the congested state, if the usage rate of the CPU thereof has temporarily fallen or the like, the gateway mobile switching center 2 can connect the speech channel to the mobile communication switching center #1, therefore the mobile communication switching center #1 can connect the radio channel to the destination mobile terminal B via the radio base station.

(5) Fifth Embodiment

In the mobile communication network shown in FIG. 11B, the public switched telephone network 1 has a priority information table 11. This priority information table 11 shows the priority order (not illustrated, for example 1 [low] to 5 [high]) corresponding to the call originating terminal subscribing to the preferential service at congestion. By utilizing this priority information table 11, in this mobile communication network provides a preferential service at congestion which determines the priority order for the call originating (not destination) mobile terminals, while the preferential service at congestion in the fourth embodiment determines the priority order for the destination mobile terminals.

Below, an explanation will be made of the operation of the method and the apparatus of the fifth embodiment according to a sequence diagram.

FIG. 7 shows the priority connection sequence at the time of congestion in the mobile communication system of the fifth embodiment. This sequence is executed when a caller calls the public switched telephone network 1 from the call originating terminal at the time of congestion.

By executing this sequence, even if the mobile communication switching center 5 is in a congested state, when a call is from a terminal having a high priority order, in the same way as the fourth embodiment described above, the gateway mobile switching center 2 connects the speech channel to the mobile communication switching center 5. At this time, if the usage rate of the CPU of the mobile communication switching center 5 has temporarily fallen or the like, the connection of the speech channel to the destination mobile terminal is enabled.

Specifically, in FIG. 7, the caller inputs the telephone number of the other party from the call originating terminal and calls the public switched telephone network 1. The public switched telephone network 1 checks whether the call is made from a terminal subscribing to the preferential service at congestion by the priority.information table 11 and, where it subscribes, checks the priority order of the call originating terminal, adds the obtained priority order as the priority information to the channel data such as the initial access message.(IAM) corresponding to the call, transfers this to the gateway mobile switching center 2, and connects the speech channel (IAM (priority information)). The gateway mobile switching center 2 requests the location of the destination mobile terminal receiving the call to the home memory center 3 and, at the same time, transfers the priority information (LOCREQ (priority information)). Note that, in the home memory center 3, the sequence until it is confirmed that the destination mobile communication switching center #1 corresponding to the request is in the congested state is the same as that explained by using FIGS. 2A and 2B in the first embodiment.

Subsequently, in the home location register 4, the home memory center 3 investigates if the priority information has been transferred responding to an inquiry as to if the destination mobile communication switching center #1 corresponding to the request (LOCREQ (priority information)) is in the congested state and, if the priority information has been transferred, investigates the priority order of the call originating terminal by the priority information (priority order check). If the result is that the priority order of the call originating terminal is high, even if the destination mobile communication switching center #1 is in a congested state, it shifts the processing to the normal connection sequence (indicated by the broken line frame D in the figure).

Subsequently, in the same way as in the first embodiment explained by using FIGS. 2A and 2B, according to the normal connection sequence (broken line frame D), the gateway mobile switching center 2 tries to connect the speech channel to the destination mobile communication switching center #1. At this time, even if the mobile communication switching center #1 is in a congested state, if there is a temporarily fall of the usage rate of the CPU or the like, the gateway mobile switching center 2 can connect the speech channel to the mobile communication switching center #1, therefore the mobile communication switching center #1 can connect the radio channel to the destination mobile terminal via the radio base station.

(6) Sixth Embodiment

In the mobile communication network shown in FIG. 11B, the home memory center 3 also has a second destination (forwarding) table 12 in addition to the above congested state management table. This second destination (forwarding) table 12 refers to the congested state management table 7 and, if the destination mobile communication switching center 5 is in the congested state, shows the second (forwarding) telephone number, which has been registered in advance, in place of the inherent telephone number. By utilizing this forwarding table 12, this mobile communication network provides a congestion call forwarding service. In this congestion call forwarding service, when a caller wants to connect with a destination mobile terminal at the time of congestion, the caller is able to connect with another mobile terminal or the like in place of this mobile terminal.

For example, if there are several salesmen of the same company subscribing to this congestion call forwarding service, when a caller wishes to speak with one salesman among them, in this congestion call forwarding service, when the caller cannot connect with the salesman due to the congested state, he is able to speak with another salesman of the group in place of speaking with that particular salesman.

Below, an explanation will be made of the operation of the method and apparatus of the sixth embodiment according to a sequence diagram.

FIG. 8 shows a congestion call forwarding sequence in a mobile communication system of the sixth embodiment. This sequence is executed when a caller calls the public switched telephone network 1 from the call originating terminal at the time of congestion.

By executing this sequence, at the time of congestion, when the caller wants to connect with the destination mobile terminal, the home memory center 3 notifies the telephone number of the call forwarding terminal engaged in another mobile communication switching center which is not in the congested state to the gateway mobile switching center 2 according to the second destination table 12 and therefore enables connection with a mobile terminal in place of the inherent mobile terminal via another mobile communication switching center.

Specifically, in FIG. 8, according to the connection sequence (broken line frame B), the caller calls the public switched telephone network 1 from the call originating terminal. Note that the sequence until it is confirmed that the destination mobile communication switching center #1 corresponding to this call is in the congested state is the same as that explained by using FIGS. 2A and 2B in the first embodiment.

Subsequently, when obtaining the telephone number of the call forwarding terminal from the call forwarding table 12 in place of the destination mobile communication switching center #1 in the congested state corresponding to the call from the terminal of the caller, the home memory center 3 notifies the telephone number of the call forwarding terminal to the gateway mobile switching center 2 together with the information of for example the mobile communication switching center #2 belonging to the call forwarding terminal (routing request response (routreq) (call forwarding number)). The gateway mobile switching center 2 transfers the channel connection data such as the initial access message (IAM) to the responded call forwarding mobile communication switching center #2 and connects the speech channel. The mobile communication switching center #2 connects the radio channel to the call forwarding mobile terminal via the radio base station.

(7) Seventh Embodiment

The mobile communication network shown in FIG. 11B is provided, in addition to the configuration of the related art, with a voice storage apparatus 6. This voice storage apparatus 6 is also laid with speech channels from the gateway mobile switching center 2 and a channel control network from the home memory center 3. The voice storage apparatus 6 has a so-called telephone answering service function for storing the content desired to be conveyed by the caller. In addition to this, it has a telephone answering and call forwarding function by storing the telephone number of another party receiving a call by a caller and then forwards a message of the telephone answering service to the destination mobile terminal later based on the telephone number of the other party. By utilizing these telephone answering function and telephone answering and call forwarding function, in this mobile communication network, the congestion telephone answering and call forwarding service is provided.

In this telephone answering and call forwarding service, even at the time of congestion, when there is a message desired to be transferred to the destination mobile terminal by a caller, by once storing the content desired to be sent, when the mobile communication switching center 5 is released from its congested state, the content desired to be sent can be heard at the destination mobile terminal by automatically forwarding the content desired to be sent to the destination mobile terminal.

The home memory center 3 has a call forwarding notification function for notifying the gateway mobile switching center 2 of the voice storage apparatus 6 as the call forwarding destination in place of the mobile communication switching center 5 if it learns that the destination mobile communication switching center 5 is in a congested state by referring to the congested state management table 7. Further, when it learns that the destination mobile communication switching center 5 returned to a normal state by referring to the above table 7, it reports that the mobile communication switching center 5 returned to the normal state to the voice storage apparatus 6 by utilizing the control channel network.

Below, an explanation will be made of the operation of the method and apparatus of the seventh embodiment according to a sequence diagram.

FIG. 9 shows a telephone answering operation sequence at the time of congestion in the mobile communication system of the seventh embodiment. Also, FIG. 10 shows a telephone answering and call forwarding operation sequence at the time of congestion in the mobile communication system of the seventh embodiment. The telephone answering operation sequence is executed at the time of congestion when a caller calls the public switched telephone network 1 from the call originating terminal.

By executing these sequences, even in a case where the caller cannot connect with the destination mobile terminal due to a congested state, according to the call forwarding service, the caller stores the content desired to be conveyed as a voice message in the voice storage apparatus 6, whereby when the mobile communication switching center 5 is released from the congested state, the message of the telephone answering service is automatically forwarded to the destination mobile terminal via the mobile communication switching center 5.

Specifically, in FIG. 9, according to the connection sequence (broken line frame B shown in FIG. 9), the caller calls the public switched telephone network 1 from the call originating terminal. Note that, in the home memory center 3, the sequence until it is confirmed that the destination mobile communication switching center #1 corresponding to this call is in the congested state is the same as that explained by using FIGS. 2A and 2B in the first embodiment.

Subsequently, the home memory center 3 notifies the gateway mobile switching center 2 of the call forwarding voice storage apparatus 6 by the call forwarding notification function (routing request. response (routreq) (voice storage apparatus number)). The gateway mobile switching center 2 forwards the channel connection data such as the initial access message (IAM) to the responded voice storage apparatus 6 and connects the speech channel. The caller sends the contents desired to be sent from its terminal to the voice storage apparatus 6 by utilizing this speech channel. The voice storage apparatus 6 stores the content (hereinafter, this will be referred to the message) as the telephone answering voice data and, at the same time, stores the telephone number of the other party receiving the call by the caller.

The mobile communication switching center #1 finally detects that the processing state has shifted from the congested state to the normal state. Note that the sequence until the response indicating that the processing state was changed to the normal state to the mobile communication switching center #1 by the home memory center 3 according to the detection result is the same as that explained by using FIGS. 2A and 2B in the first embodiment.

As shown in FIG. 10, when the mobile communication switching center #1 returns from the congested state to the normal state, the home memory center 3 notifies the voice storage apparatus 6 via the control channel network that the congested state of the mobile communication switching center #1 was released and the processing state returned to the normal state (notification of release of congestion). The voice storage apparatus 6 automatically forwards, in response to the above report, the channel connection data such as the initial access message (IAM) to the mobile communication switching center #1 based on the telephone number of the other party stored together with the messages so far and connects the speech channel. The mobile communication switching center #1 connects the radio channel to the destination mobile terminal via the radio base station. The voice storage apparatus 6 automatically forwards the telephone answering voice data to the destination mobile terminal via the radio channel. At the destination mobile terminal, the voice message which the mobile communication switching center #1 has not been able to receive due to the congested state can be heard.

Note that, in place of automatic forwarding of a message from the voice storage apparatus 6, it is also possible to operate the destination mobile terminal, when a predetermined time arrives, to try to listen to the messages of the telephone answering service stored. At that time, when the mobile communication switching center #1 is in a normal state, it becomes possible to listen to the messages at the destination mobile terminal.

In working the present invention, a variety of modifications are possible.

In the embodiments, the explanation was made of the case, where the mobile communication switching center became a congested state in processing of switching in mobile communication, but the present invention is not limited to this. That is, even in a case where a variety of congested states occur other than this in the following processing including the processing of the mobile communication switching center, the mobile communication switching center may report the congested state to the home memory center 3 in advance.

Specifically, by mounting, inside the home memory center 3, a congested state management table representing the processing state (congested or normal) of the radio base station accommodated in the mobile communication switching center, even in a case where a plurality of radio base stations accommodated in the mobile communication switching center become congested due to congested connection requests due to the limit in the number of radio channels, the mobile communication switching center detects the congested state of these radio base stations for every home location registration area and reports the result of the detection via the control channel network to the home memory center 3 and the home memory center 3 manages, based on the report, the processing states of the radio base stations for every home location registration area by the congested state management.

Due to this, it is possible to determine in advance that the radio base station of the mobile communication switching center in whose area the destination mobile terminal exists is congested for every home location registration area by the congested state management table, so the gateway mobile switching center 2 can be prevented from wastefully connecting the speech channel to a mobile communication switching center having a radio base station in the congested state in units of home location registration areas.

Summarizing the advantageous effects of the invention, according to the present invention, since it is determined in advance that the destination mobile communication switching center is in a congested state, the time for processing of switching in mobile communications can be reduced by the amount of the wasteful connection of speech channels, which would be achieved by the prior art gateway mobile switching center 2, to a mobile communication switching center in the congested state and an efficient mobile communication system with little useless processing can be realized.

What we claim is:

1. A method for controlling the restriction on traffic in a mobile communication system where, in mobile communications where a call originating terminal calls and connects with a destination mobile terminal through a switching network, the call originating terminal calls up and connects a speech channel to a gateway mobile switching center, the gateway mobile switching center requests a destination to be connected to the call to a management center managing the locations of mobile terminals, the management center investigates the destination mobile communication switching center from among a plurality of mobile communication switching centers and responds with the destination mobile communication switching center obtained by the investigation to the gateway mobile switching center, the gateway mobile switching center connects the speech channel to the responded destination mobile communication switching center, and the mobile communication switching center connects the radio channel to the destination mobile terminal via a radio base station, the method comprising:

having the mobile communication switching center report a processing state of a congested state or a normal state to the management center in advance;

having the management center manage the processing states of the mobile communication switching centers based on the reports of the processing states;

having the management center investigate the processing state of a destination mobile communication switching center in response to a request, from the gateway mobile switching center, for the location of a destination to be connected to the call; and controlling such that, when the processing state is the congested state, the gateway mobile switching center does not connect a speech channel to the mobile communication switching center in the congested state.

2. A method for controlling the restriction on traffic in a mobile communication system as set forth in claim 1, wherein the mobile communication switching center reports its processing state, that is, the congested state or the normal state, to the management center when the state shifts to the congested state or normal state and the management center manages the processing states of mobile communication switching centers based on the reports of processing states.

3. A method for controlling the restriction on traffic in a mobile communication system as set forth in claim 1, wherein the mobile communication switching center periodically reports one processing state to the management center when the processing state is either the congested state or the normal state and the management center manages processing states of the mobile communication switching centers to change a processing state to another processing state when the report of said one processing state is not periodically made from the mobile communication switching center.

4. A method for controlling the restriction on traffic in a mobile communication system as set forth in claim 1, wherein the management center cyclically inquires about processing states to mobile communication switching centers and manages, when the processing states are returned from the mobile communication switching centers, the processing states of the mobile communication switching centers based on the returned reports of the processing states when the processing states.

5. A method for controlling the restriction on traffic in a mobile communication system as set forth in claim 1, wherein control is carried out so that the management center assigns a priority order to a destination mobile terminal in advance and, when the priority order of the destination mobile terminal is high, even if the destination mobile communication switching center is in a congested state, notifies the mobile communication switching center in the congested state as the destination to the gateway mobile switching center and so that the gateway mobile switching center connects the speech channel to the notified mobile communication switching center.

6. A method for controlling the restriction on traffic in a mobile communication system as set forth in claim 1, wherein control is carried out so that the management center assigns a priority order to a call originating terminal in advance and, when the priority order of the call originating terminal is high, even if the destination mobile communication switching center is in the congested state, notifies the mobile communication switching center in the congested state as the destination to the gateway mobile switching center and so that the gateway mobile switching center connects the speech channel to the notified mobile communication switching center.

7. A method for controlling the restriction on traffic in a mobile communication system as set forth in claim 1, wherein control is carried out so that the management center determines a forwarding terminal as terminal information in advance for a destination mobile terminal and, when the mobile communication switching center in whose area the destination mobile terminal exists is in a congested state, notifies the terminal information to the gateway mobile switching center and the gateway mobile switching center connects the speech channel to the mobile communication switching center to which the forwarding terminal belongs based on the terminal information.

8. A method for controlling the restriction on traffic in a mobile communication system as set forth in claim 1, wherein the management center notifies the gateway mobile switching center of a voice storage apparatus for storing a message as the destination in place of the mobile communication switching center in the congested state, the gateway mobile switching center connects a speech channel to the destination voice storage apparatus according to the notification, and the voice storage apparatus stores the voice message of the caller.

9. A method for controlling the restriction on traffic in a mobile communication system as set forth in claim 8, wherein the management center reports that the processing state has returned to a normal state to the voice storage apparatus when the processing state of the destination mobile communication switching center shifts from a congested state to a normal state and the voice storage apparatus automatically forwards, in response to the report, the message to the mobile communication switching center which has returned to a normal state.

10. An apparatus for controlling the restriction on traffic in a mobile communication system, where, in mobile communications where a call originating terminal calls and connects with a destination mobile terminal through a switching network, the call originating terminal calls up and connects a speech channel to a gateway mobile switching center requests a destination to be connected to the call to a management center managing the locations of mobile terminals, the management center investigates the destination mobile communication switching center from among a plurality of mobile communication switching centers and responds with the destination mobile communication switching center obtained by the investigation to the gateway mobile switching center, the gateway mobile switching center connects the speech channel to the responded destination mobile communication switching center, and the mobile communication switching center connects the radio channel to the destination mobile terminal via a radio base station, the apparatus comprising:

a report means provided in the mobile communication switching center for reporting a processing state, i.e., a congested state or a normal state, to the management center in advance;

a management means provided in the management center for managing the processing states of the mobile communication switching centers based on the reports of the processing states;

a notifying means provided in the management center for checking, based on the management means, a processing state of a destination mobile communication switching center corresponding to an inquiry, from the gateway mobile switching center, on the location of a destination corresponding to a call and notifying its congested state to the gateway mobile switching center when the processing state is a congested state; and a control means provided in the gateway mobile switching center for controlling the gateway mobile switching center so that, when receiving the notification of the congested state, it does not connect a speech channel to the mobile communication switching center in the congested state.

11. An apparatus for controlling the restriction on traffic in a mobile communication system as set forth in claim 10, wherein:

the report means reports a processing state, i.e., a congested state or a normal state, to the management center when the state shifts to the congested state or the normal state and the management means manages the processing states of the mobile communication switching centers based on the reports of processing states.

12. An apparatus for controlling the restriction on traffic in a mobile communication system as set forth in claim 10, wherein:

the report means periodically reports one processing state to the management center when the processing state is either the congested state or the normal state and the management center manages processing states of the mobile communication switching centers to change a processing state to another processing state when the report of said one processing state is not periodically made from the mobile communication switching center.

13. An apparatus for controlling the restriction on traffic in a mobile communication system as set forth in claim 10, wherein the management means cyclically inquires about the processing states to the mobile communication switching centers and manages, when the processing states are returned from the mobile communication switching centers, the processing states of the mobile communication switching centers based on the returned reports of the processing states.

14. An apparatus for controlling the restriction on traffic in a mobile communication system as set forth in claim 10, wherein control is carried out so that:

the management center assigns a priority order to a destination terminal in advance and, when the priority order of the destination terminal is high, even if the destination mobile communication switching center is in the congested state, notifies the mobile communication switching center in the congested state as the destination to the gateway mobile switching center; and the gateway mobile switching center connects the speech channel to the notified mobile communication switching center.

15. An apparatus for controlling the restriction on traffic in a mobile communication system as set forth in claim 10, wherein control is carried out so that:

the management center assigns a priority order to a call originating terminal in advance and, when the priority order of the call originating terminal is high, even if the destination mobile communication switching center is in the congested state, notifies the mobile communication switching center in the congested state as the destination to the gateway mobile switching center and the gateway mobile switching center connects the speech channel to the notified mobile communication switching center.

16. An apparatus for controlling the restriction on traffic in a mobile communication system as set forth in claim 10, wherein control is carried out so that:

the management center determines a forwarding terminal as terminal information in advance for a destination mobile terminal and, when the mobile communication switching center in whose area the destination mobile terminal exists is in a congested state, notifies the terminal information to the gateway mobile switching center and the gateway mobile switching center connects the speech channel to the mobile communication switching center to which the forwarding terminal belongs based on the terminal information.

17. An apparatus for controlling the restriction on traffic in a mobile communication system as set forth in claim 10, wherein:

provision is made of a voice storage means for storing a voice message;

when the mobile communication switching center in whose area the destination mobile terminal exists is in a congested state, the management center notifies the gateway mobile switching center of the voice storage means as the destination in place of the mobile communication switching center in the congested state; and the mobile communication switching center connects the speech channel to the destination voice storage means according to the notification.

18. An apparatus for controlling the restriction on traffic in a mobile communication system as set forth in claim 17, wherein:

the report means reports to the voice storage means that a processing state has returned to the normal state when the processing state of the destination mobile communication switching center shifts from the congested state to the normal state and the voice storage means automatically forwards the message to the mobile communication switching center which returned to the normal state according to the report.

19. A mobile communication switching center of a mobile communication system, where, in mobile communications where a call originating terminal calls and connects with a destination mobile terminal through a switching network, the call originating terminal calls up and connects a speech channel to a gateway mobile switching center, the gateway mobile switching center requests a destination to be connected to the call to a management center managing the locations of the mobile terminals, the management center investigates the destination mobile communication switching center from among a plurality of mobile communication switching centers and responds with the destination mobile communication switching center obtained by the investigation to the gateway mobile switching center, the gateway mobile switching center connects the speech channel to the responded destination mobile communication switching center, and the mobile communication switching center connects the radio channel to the destination mobile terminal via a radio base station, a report means provided in the mobile communication switching center for reporting one of a congested processing state and a normal processing state, to the management center in advance, for managing of said processing state by said management center.

20. A management center of a mobile communication system where, in mobile communications where a call originating terminal calls and connects with a destination mobile terminal through a switching network, the call originating terminal calls up and connects a speech channel to a gateway mobile switching center, the gateway mobile switching center requests a destination to be connected to the call to a management center managing the locations of the mobile terminals, the management center investigates the destination mobile communication switching center from among a plurality of mobile communication switching centers and responds with the destination mobile communication switching center obtained by the investigation to the gateway mobile switching center, the gateway mobile switching center connects the speech channel to the responded destination mobile communication switching center, and the mobile communication switching center connects the radio channel to the destination mobile terminal via a radio base station, a provision is made of:

a receiving means for receiving a report of a processing state, i.e., a congested state or normal state, from the mobile communication switching center;

a management means for managing the processing states of the mobile communication switching centers based on the reports to the receiving means; and a notifying means for investigating the processing state of a destination mobile communication switching center corresponding to an inquiry, from the gateway mobile switching center, on the location of the destination to be connected to the call and, when the processing state is the congested state, notifying the gateway mobile switching center of the fact that the mobile communication switching center is in a congested state.

21. A gateway mobile switching center of a mobile communication system, where, in mobile communications where a call originating terminal calls and connects with a destination mobile terminal through a switching network, the call originating terminal calls up and connects a speech channel to a gateway mobile switching center, the gateway mobile switching center requests a destination to be connected to the call to a management center managing the locations of the mobile terminals, the management center investigates the destination mobile communication switching center from among a plurality of mobile communication switching centers and responds with the destination mobile communication switching center obtained by the investigation to the gateway mobile switching center, the gateway mobile switching center connects the speech channel to the responded destination mobile communication switching center, and the mobile communication switching center connects the radio channel to the destination mobile terminal via a radio base station, a provision is made of:
    a receiving means for receiving from the management center a notification that the destination mobile communication switching center is in a congested state and
    a restricting means for preventing connection of a speech channel to a mobile communication switching center in a congested state according to the notification of the congested state.

\* \* \* \* \*